United States Patent
Lee et al.

(10) Patent No.: US 12,324,010 B2
(45) Date of Patent: Jun. 3, 2025

(54) DETECTION AND MITIGATION OF AGGRESSIVE MEDIUM RESERVATIONS

(71) Applicant: Cypress Semiconductor Corporation, San Jose, CA (US)

(72) Inventors: Hyun Jong Lee, Seocho-gu (KR); Dong Seok Kang, San Jose, CA (US); Chi Woo Lee, Namyangju-si (KR)

(73) Assignee: Cypress Semiconductor Corporation, San Jose, CA (US)

( * ) Notice: Subject to any disclaimer, the term of this patent is extended or adjusted under 35 U.S.C. 154(b) by 443 days.

(21) Appl. No.: 17/963,859

(22) Filed: Oct. 11, 2022

(65) Prior Publication Data
US 2024/0121813 A1    Apr. 11, 2024

(51) Int. Cl.
*H04W 72/542*    (2023.01)

(52) U.S. Cl.
CPC .................................. *H04W 72/542* (2023.01)

(58) Field of Classification Search
CPC ................................................. H04W 72/542
USPC ....................................................... 370/329
See application file for complete search history.

(56) References Cited

U.S. PATENT DOCUMENTS

| | | | | |
|---|---|---|---|---|
| 2009/0264142 | A1* | 10/2009 | Sankar | H04L 5/0032 455/501 |
| 2022/0124679 | A1* | 4/2022 | Ye | H04W 24/10 |
| 2023/0090228 | A1* | 3/2023 | Sekiya | H04L 5/0032 370/329 |

* cited by examiner

*Primary Examiner* — Christopher R Crompton

(57) ABSTRACT

Implementations disclosed describe wireless devices and methods for mitigating aggressive medium reservations. A first wireless device comprises a transceiver and a processor coupled to the transceiver. The processor is to detect, within a first transmission received by the transceiver from a second wireless device via a first wireless communication channel, a pattern of medium reservations comprising a reservation duration that satisfies a threshold duration value. The processor is further to cause, in response to detecting the pattern of medium reservations, the transceiver to send a second transmission to an access point (AP) wireless device. The second transmission includes an indication of the pattern of medium reservations. The processor is further to detect a medium reservation mitigation signal within a third transmission received by the transceiver from the AP wireless device.

20 Claims, 10 Drawing Sheets

US 12,324,010 B2

DETECTION AND MITIGATION OF AGGRESSIVE MEDIUM RESERVATIONS

TECHNICAL FIELD

The disclosure pertains to wireless networks; more specifically, to detection and mitigation of aggressive medium reservations by devices of a wireless network.

BACKGROUND

Wireless devices communicate with each other via one or more communication mediums, e.g., wireless communication frequencies, communication channels, or the like. Wireless devices of a wireless network may conform to one or more wireless communication protocols. Wireless communication protocols that a wireless network may conform to include 802.11 protocols. In some systems, a wireless device may receive wireless signals from multiple wireless networks. In some systems, two wireless devices of a wireless network may receive signals from a different set of devices.

DETAILED DESCRIPTION

Figure 1:
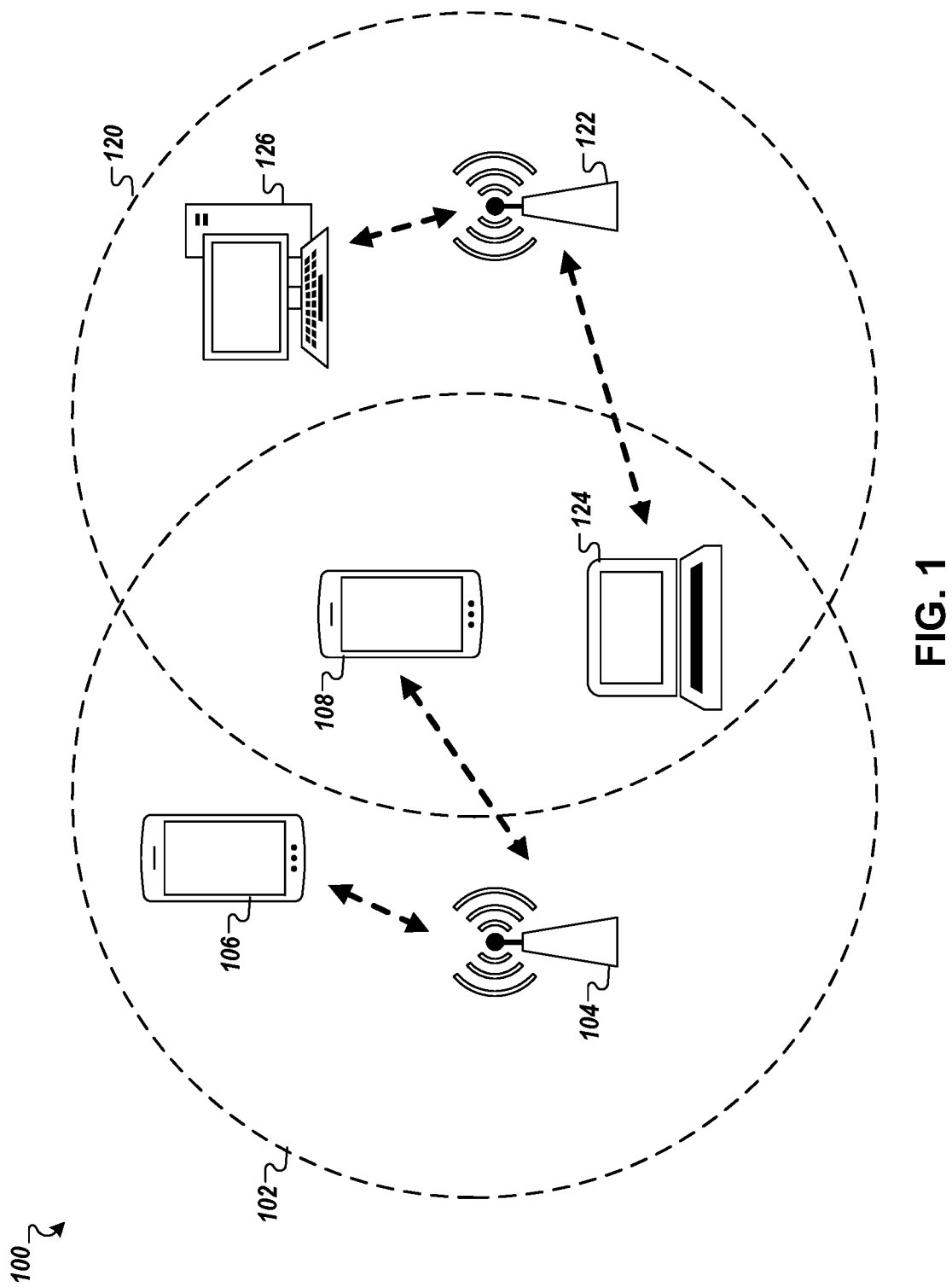
FIG. 1 is a network diagram illustrating overlapping networks, according to some embodiments.

Aspects of the present disclosure are directed at optimizing performance of wireless devices by mitigating aggressive medium reservations, in particular aggressive medium reservations received by station devices. In some systems, different wireless networks may share one or more communication mediums. For example, two wireless networks may share a range of communication frequencies, one or more communication channels, or the like. Two wireless networks may share a communication band. Two wireless networks may share a 2.4 GHz wireless communication band, a 5 GHz wireless communication band, or another wireless communication band. Some networks may include devices that communicate using IEEE 802.11 or other wireless protocols. Networks of 802.11-capable devices may share the same pool of wireless communication channels, overlapping pools of wireless communication channels, and the like. As used herein, a channel refers to a portion of the network medium used for communication. The network medium may be a list of communication frequencies, a range of communication frequencies, a standard communication frequency band, or the like.

To minimize co-channel interference, wireless devices typically manage channel usage utilizing one or more channel interference management tools. Channel interference management tools may include carrier sense multiple access with collision avoidance (CSMA-CA) protocol. Channel interference management tools may include detecting whether a channel is idle or busy. Detecting channel activity may include physical and virtual detection. Physical carrier sensing (physical detection) may detect whether a channel is busy due to current energy levels detected on the channel. Virtual carrier sensing may detect whether the channel is reserved for use by a device at a future time. Virtual carrier sensing may detect whether the channel is reserved for future communication frames following the current frame.

Virtual carrier sensing allows wireless devices to reserve a communication medium for frames that the devices are scheduled to communicate. Virtual carrier sensing may enable a wireless device to reserve one or more communication channels. Virtual carrier sensing may enable a wireless device to reserve a communication medium for a span of time associated with sending and/or receiving network packets. As used herein, a frame is a digital data transmission unit. A frame may contain or include one or more network packets. In some networks, medium reservation operations are performed according to 802.11 wireless protocols. Reservation duration may be indicated in a 802.11 media access control (MAC) header duration field, which is part of the MAC protocol data unit (MPDU) exchanged between MAC entities (e.g., of wireless devices). The duration value in the MAC header may indicate the time scheduled for the transmission of frames, including interframe spacing, after the current frame. The duration value in the MAC header may indicate the time scheduled for interframe spacing after the communication frame which includes the reservation duration value. In some systems, the duration value represents one or more interframe spacings and the time (e.g., in microseconds) for the intended recipient to communicate one or more frames with the sender. Interframe spacings may include short interframe spacing (SIFS). Wireless devices capable of decoding the 802.11 MAC header (or another form of data including medium reservation) may extract the duration field value and save it to facilitate avoidance of communication on the reserved channel. For example, the wireless device may save the duration field value as a network allocation vector (NAV) value to mark the medium as busy for the amount of time specified. The wireless device may then count down from the initial NAV value and may consider the channel to be busy or reserved for as long as the NAV value is non-zero.

Some wireless devices may aggressively reserve communication media, e.g., may misuse the duration field in MAC headers, may delay communication among other devices, etc. Wireless devices that perform aggressive medium reservations may include station devices and access point (AP) devices. Aggressive medium reservations may delay communication among devices belonging to a different wireless network that shares the communication medium. For example, two networks may both communicate via the 2.4 GHz wireless communication band. One or more devices may be within range of both networks. Aggressive medium reservations associated with one network may slow communication between devices of the other network. Aggressive channel reservations may include standard compliant and/or standard non-compliant (e.g., greater than the transmit opportunity (TXOP) maximum for each access category) channel reservation durations that "hog" the medium for the wireless device's own network transmissions. These aggressive reservations, when decoded and obeyed by one or more wireless devices, may cause the one or more wireless devices to suffer poor network performance. The aggressive medium reservations may affect devices belonging to a different wireless network than the device transmitting the aggressive reservations. Poor network performance may include latency of critical audio, video, or voice data.

Through carrier sensing operations, a wireless device may determine a channel to be free of traffic. Carrier sensing operations may include physical carrier sensing operations. Carrier sensing operations may include virtual carrier sensing operations. Once a channel is determined to be free of traffic, the wireless device may then perform collision avoidance operations. Collision avoidance operations may include waiting a period after detecting the channel to be idle before transmitting a message. The waiting period may be variable, depending, for example, on the type of information to be transmitted. The waiting period may depend on the access category of the information to be transmitted.

Reservations of communication media by one or more devices may cause contention delay in a wireless network. Contention delay can be a significant factor affecting network performance. For example, wireless local area network (WLAN) communication can be significantly delayed due to aggressive medium reservations. In some systems, wireless devices may employ techniques to proactively identify wireless devices practicing aggressive medium reservation that causes other devices to suffer service interruptions. Wireless devices may employ techniques to proactively identify wireless devices of other wireless networks to suffer service interruptions. Wireless devices may employ techniques to mitigate effects of aggressive medium reservations. AP wireless devices may detect one or more medium reservations. The AP wireless device may then determine that the medium reservations together generate an aggressive pattern of medium reservations. The AP wireless device may determine that the reservations are aggressive responsive to, for example, the reservation durations meeting or exceeding a threshold duration value. The AP wireless device may provide a mitigation signal to prevent an associated wireless device from yielding the communication medium to the aggressive device. The associated device may be a station device on the same network as the AP device. In some systems, the associated device may then communicate via the reserved medium.

In some systems, detecting patterns of aggressive medium reservations and providing a mitigation signal may be performed by an AP device while station (STA) devices may be capable of only detecting such patterns of aggressive media reservations. In some systems, an AP device may not detect a pattern of aggressive reservations because the AP device is outside the communication range of an originator device that is transmitting the pattern of aggressive medium reservations. In such systems, another device of the same network as the AP device, such as a STA device, may be able to detect the pattern of aggressive reservation signals. In such systems, the STA device may be within range and thus detect the pattern of aggressive medium reservations, while the AP device is unable to generate and transmit a medium reservation mitigation signal due to being unaware the pattern of aggressive medium reservations. Thus, the AP device is unable to mitigate against the aggressive medium reservation behavior of the originator device.

Aspects of the present disclosure may address one or more of these shortcomings of other systems. In some embodiments, as discussed, the STA device detects a transmission from the originator device that includes a pattern of medium reservation indicative of aggressive reservation behavior. The STA device may transmit, to the AP device, a message indicating the detected pattern of aggressive medium reservation to an AP device. Upon detection, the AP device may then transmit an aggressive medium reservation mitigation signal to the STA device.

Detecting the pattern of medium reservations may include analyzing various reservation attributes, which may include, for example, reservation durations, medium idle periods, intervals between suspect frames (e.g., frames suspected to be part of a pattern of aggressive reservations), number of suspect frames, suspect frame source and/or recipients, and the like. In some embodiments, detecting patterns of medium reservations includes comparing reservation attributes to one another and/or to medium reservation threshold values.

Mitigation operations may include transmitting a mitigation signal from the AP device to one or more STA devices. In some embodiments, the mitigation signal causes the STA device to switch to communicating on a different channel. In some embodiments, the mitigation signal includes a frame transmitted at a selected time, power, length, direction, and/or frequency in order to interfere with the STA device's ability to decode frames. Transmit beamforming or narrowband transmission may be utilized in transmitting the mitigation signal. For example, the mitigation signal may interfere with the STA device's ability to decode frames including the aggressive medium reservations. The mitigation signal may interfere with the STA device's ability to decode frames sent by the wireless device transmitting aggressive medium reservations. In some embodiments, the mitigation signal is a WLAN frame that causes the STA device to clear its own NAV. For example, the mitigation signal may be transmitted as a part of a contention free-end (CFend) frame or may be included as a vendor-specific element of a transmitted frame. The mitigation signal may include instructions. The mitigation signal may include instructions to ignore reservations sent by the device performing aggressive medium reservation operations.

These methods and devices may provide technical advantages to devices, systems, and networks that utilize them. Service interruptions to wireless communication may be reduced due to mitigating the influence of aggressive medium reservations. A network of wireless devices utilizing techniques associated with this disclosure can detect the presence of devices performing aggressive medium reservation operations and provide an appropriate mitigation operation so that traffic can proceed during periods in which network traffic may have been delayed without these techniques. In some embodiments, arrangements of certain wireless devices are susceptible to aggressive reservations, which may be resolved utilizing techniques described herein. For example, arrangements in which a STA device of a wireless network is within range of the originator device of the pattern of aggressive medium reservations, but an AP device of the wireless network is not within range may benefit from techniques of the present disclosure. The STA device may not be an AP device. The device from which the aggressive medium reservations originate may be a hidden note with respect to the AP device.

In some embodiments, overlapping networks may include hidden nodes. A hidden node is a wireless device that is out of range of another device. A hidden node may be a device that is spatially too far to communicate with another device. A hidden node may be a device that is separated from a second device by a medium that inhibits transmission of communications. A hidden node may be a device that experiences interference, which limits or eliminates the ability of the device to communicate with another device. For example, an AP device of a first network may be out of range of the originator device of a second network, but a station (STA) device of the first network may be in range of the originator device of the second network. The originator device of the second network may be a hidden node with respect to the AP device of the first network. In some embodiments, the presence of hidden nodes leads to communication conflicts. For example, the AP device may transmit a message to the station device at a first time, utilizing a first communication frequency. A message may be sent from the originator device of the second network to the station device at the first time, utilizing the first communication frequency. The station device may receive multiple transmissions that conflict (e.g., overlap in time) due to the originator device of the second network being a hidden node with respect to the AP device. The station device may transmit one or more messages in a transmission to the AP device. The station device may transmit messages including indications of a pattern of aggressive medium reservations by the originator device of the second wireless network. The AP device, in response to receiving, from the station device, the indication of the indication of the pattern of aggressive medium reservation, may initiate mitigation measures. Aggressive medium reservation mitigation measures may include the AP device transmitting a medium reservation mitigation signal out onto the network, including to the station device.

The detailed description of this disclosure includes references to the accompanying drawings, which form a part of the detailed description. The drawings show illustrations in accordance with embodiments. These embodiments are described in enough detail to enable those skilled in the art to practice embodiments of the claimed subject matter. The embodiments may be combined, other embodiments may be utilized, or structural, logical, and/or electrical changes may be made without departing from the scope of what is claimed. The scope of the claims is not to be taken as limited by the embodiments described in the detailed description.

FIG. 1 is a network diagram illustrating overlapping networks 100, according to some embodiments. A first network 102 and a second network 120 may each be wireless communication networks. Networks 102 and 120 may each be WLANs utilizing 802.11 communication protocols, for example, to communicate among associated wireless devices. Wireless devices of first network 102 and second network 120 may be communicatively coupled. The two networks 102 and 120 may utilize the same one or more communication bands, same one or more communication channels, overlapping bands or channels, etc., for wireless communication. While embodiments herein may describe the 2.4 GHz frequency band as an example, techniques and devices described herein may be equally applicable to other frequency bands including the 5 GHz band, the 6 GHz band, or any other wireless communication medium delayed by aggressive medium reservations.

First network 102 includes a first access point (AP) device 104. AP device 104 may be wirelessly coupled to a number of wireless devices 106 and 108. Wireless devices coupled to AP device 104 may be STA devices. The wireless coupling is depicted by dashed arrows in FIG. 1. AP device 104 may be a hardware AP device or a software enabled AP device (e.g., a SoftAP). Wireless devices 106 and 108 may include, for example, mobile phones, tablets, entertainments systems, personal computers, laptop computers, internet of things devices, or the like. In some exemplary embodiments, first network 102 may be a mobile network (e.g., associated with a transportation vehicle such as an automobile). A mobile network, as used herein, includes a network of two or more wireless devices, wherein at least one of the wireless devices can move among geographical locations. In some embodiments of a mobile network, more than one wireless device may move, together or separately, among geographical locations. For example, an AP device and one or more STA devices may be included in a mobile network.

Second network 120 includes base station 122 coupled to wireless device 124 and 126. In some embodiments, base station 122 communicates with devices of second network 120 using 802.11 protocol frames that are decodable, at least in part, by devices associated with network 102. In particular, wireless devices 108 and 124 may receive communication frames from both AP device 104 and base station 122. In some embodiments, wireless device 108 may be closer to base station 122 than AP device 104 is to base station 122. In some embodiments, wireless device 108 may include reception circuitry more sensitive to transmissions from base station 122 than the reception circuitry of AP device 104. In some embodiments, wireless device 108 may experience less interference with respect to transmissions from base station 122 than AP device 104 experiences, or any other arrangement may exist that allows wireless device 108 to detect transmissions from base station 122 that AP device 104 cannot detect. In some embodiments, wireless device 108 may receive transmissions from base station 122 more reliably than does AP device 104, may decode transmissions from base station 122 more accurately than AP device 104, and so forth. In some embodiments, base station 122 may use the duration field of 802.11 MAC headers in a way that aggressively reserves one or more channels being used for communication in both networks 102 and 120. Base station 122 may use the duration field 802.11 MAC headers to aggressively reserve communication media for the use of devices of second network 120. These aggressive reservations, when decoded by first network 102 wireless devices, causes contention delay that results in poor network performance in first network 102. Contention delay may include delay due to conflicting message timing, delay due to conflicting medium reservations, etc. Co-channel interference caused by contention delay can cause significant decreases in throughput and/or increases in latency.

In some embodiments, AP device 104 is configured to perform aggressive medium reservation mitigation operations. Aggressive medium reservation mitigation operations may include transmitting a message instructing other devices (e.g., STA devices of first network 102) to perform one or more operations to reduce the impact of the aggressive reservations. For example, aggressive medium reservation mitigation messages may include instructions to clear from memory data indicative of a medium reservation. Aggressive medium reservation mitigation messages may include instructions to clear a network allocation vector (NAV) value. AP device 104 may be outside a range of an originator device (such as base station 122) that is transmitting the aggressive medium reservations. A STA device of first network 102 such as wireless device 108 may detect the aggressive medium reservations. The STA device may transmit one or more messages including an indication of the aggressive medium reservations to AP device 104. Responsive to receiving the indication of the aggressive medium reservation, AP device 104 may transmit one or more messages including aggressive medium reservation mitigation operations.

Figure 2:
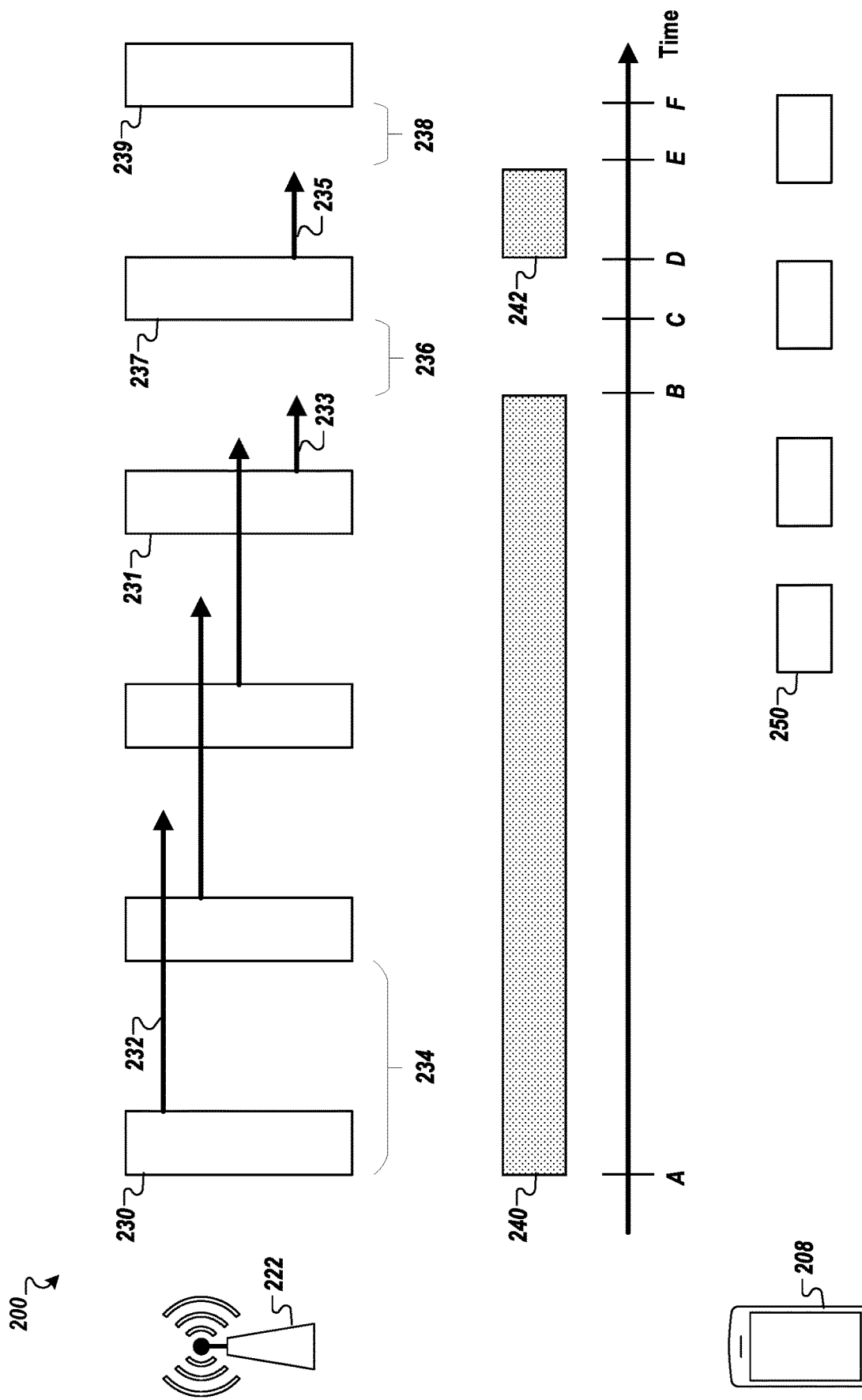
FIG. 2 is a timing diagram illustrating medium reservation patterns, according to some embodiments.

FIG. 2 is a timing diagram 200 illustrating medium reservation patterns, according to some embodiments. Wireless device 222 may be transmitting frames including medium reservations. The medium reservations may exhibit one or more patterns of medium reservations in a way that may cause contention delay in another network. Wireless device 222 may share features with base station 122 of FIG. 1, or another wireless device of a network exhibiting aggressive medium reservations. In various embodiments, the other wireless device may be wireless device 124 and the network may be network 120 of FIG. 1. Reservations of wireless device 222 may interfere with operation of wireless device 204, as shown and described with regards to FIG. 1.

Timing diagram 200 includes a series of frames (230, 231, 237, and 239) transmitted at intervals by wireless device 222. An exemplary interval 234 is shown for frame 230. The interval between one pair of frames may be the same or different as the interval between another pair of frames. Each frame may include a reservation duration. Reservation durations may vary (as shown with reservation durations 232, 233, and 235) represented by the length of an arrow in timing diagram 200. A reservation duration may correspond to the amount of time a wireless device claims that a communication medium (also referred to as a wireless communication channel) is to be kept free to facilitate the wireless device completing a communication process. Reservation durations may vary among reservation signals.

Timing diagram further includes wireless device 208, which may receive transmissions from wireless device 222. Wireless device 208 may be a station device that is within range of multiple wireless networks, such as wireless device 108 of FIG. 1. Wireless device 208 may be associated with a different network than wireless device 222. For example, wireless device 208 may be part of first network 102 of FIG. 1, and wireless device 222 may be part of second network 120 of FIG. 1. Wireless device 208 may not be an AP device. Wireless device 208 may be an 802.11-capable STA wireless device. Wireless device 208 may receive transmissions from wireless device 222 including medium reservations. Wireless device 208 may receive and/or store an indication that one or more communication channels are busy between time A and time B, corresponding to the duration of medium reservation 240. A number of reservations may have durations that extend through the time of arrival of a later reservation, as depicted by reservation duration 232. A series of reservations may overlap, such that the communication medium may be reserved for an extended period of time. A communication medium may be reserved until a final overlapping reservation duration expires, such as when reservation 233 expires at time B. Between times B and C, the channel is not reserved by wireless device 222, and wireless device 208 may consider the channel to be in an idle state during idle duration 236. Wireless device 208 may utilize both medium reservation messages and detection of energy in the medium during idle duration 236 to determine whether the medium is idle. Wireless device 208 may consider the medium to be idle until wireless device 208 receives another frame, shown as frame 237 at time C. The medium may then appear to be reserved by wireless device 222 at time D until time E. Wireless device 222 may include a medium reservation in frame 237 with a duration depicted by duration 235. The medium may then be considered idle for the duration of idle period 238 until frame 239 is received at time F.

In some embodiments, aggressive medium reservation mitigation measures may be initiated by an AP device such as AP device 104. For example, a STA device such as wireless device 208 may receive one or more medium reservations from an originator device, such as base station 122 or wireless device 222. An AP device such as AP device 104 of the same network as the STA device may not receive (and/or detect) the one or more medium reservations from the originator device. For example, the AP device 104 may be too far away from the originator device, may be shielded from transmissions from the originator device, or the like. The wireless device 208 may transmit a message indicating the medium reservations to the AP device 104 of the same network as the wireless device 108, e.g., the first network 102 (FIG. 1). The AP device 104 may determine that the one or more reservations is indicative of an aggressive pattern of reservations, may determine an appropriate mitigation response, and may transmit a signal associated with the selected mitigation response to other wireless devices of the network to cause the performance of mitigation operations.

In some embodiments, the AP device 104 may perform aggressive medium reservation mitigation operations responsive to receiving one or more transmissions from a STA device, such as the wireless device 108 or 208, indicative of the aggressive medium reservations. The wireless device 208 may act as a detector of aggressive medium reservation transmissions. A STA device of a wireless network may act as a detector of aggressive medium reservation transmissions. A STA device of a wireless network may transmit indications of aggressive medium reservations to an AP device, and the AP device may perform medium reservation mitigation operations. In some embodiments, the wireless device 208 may transmit indications of detected medium reservations to the AP device 104. The indications may include time information (e.g., start time, end time, duration, etc.), reserved medium information (e.g., channel ID), requesting device ID, and the like. In some embodiments, the AP device 104 may determine that the medium reservations satisfy one or more conditions of a pattern of aggressive medium reservations. Conditions to qualify as a pattern of aggressive medium reservations may include meeting or exceeding one or more thresholds, such as total reservation time, continuous reservation time, or the like. In some embodiments, the wireless device 208 may determine that the medium reservations satisfy one or more conditions of a pattern of aggressive medium reservations, and may transmit a message indicative of the pattern detected to the AP device 104.

The wireless device 208 may receive various patterns of aggressive medium reservations, may prompt mitigation measures, may be resisted by medium reservation mitigation operations, and the like. Reservation patterns may be detected based on one or more attributes. Attributes used to determine if one or more reservations are indicative of a pattern of aggressive medium reservations may include sender address, intended recipient address, frame type including the reservation, number of reservations received, number of frames including reservations received, repetition intervals between reservations, repetition intervals between frames including reservations, reservation durations, length of medium reservation, relationship between repetition interval and reservation duration, idle time, relationship between idle time and repetition interval, and/or total duration of medium reservations over a period of time (e.g., a period of time encompassing multiple medium reservations).

Once a determination has been made that received medium reservations indicate an aggressive pattern of medium reservations, the AP device 104 may perform mitigation operations. FIG. 2 depicts one example of results of mitigation operations. Wireless device 208 may detect one or more aggressive medium reservation mitigation transmissions. Responsive to detecting the mitigation transmissions, wireless device 208 may communicate one or more messages (e.g., traffic 250) utilizing the reserved medium during periods that wireless device 208 would otherwise yield the communication medium to wireless device. Reception of the mitigation transmission(s) may cause wireless device to utilize a communication medium that, in the absence of the mitigation transmissions, may have been yielded in response to channel reservations 240 and/or 242.

Figure 3:
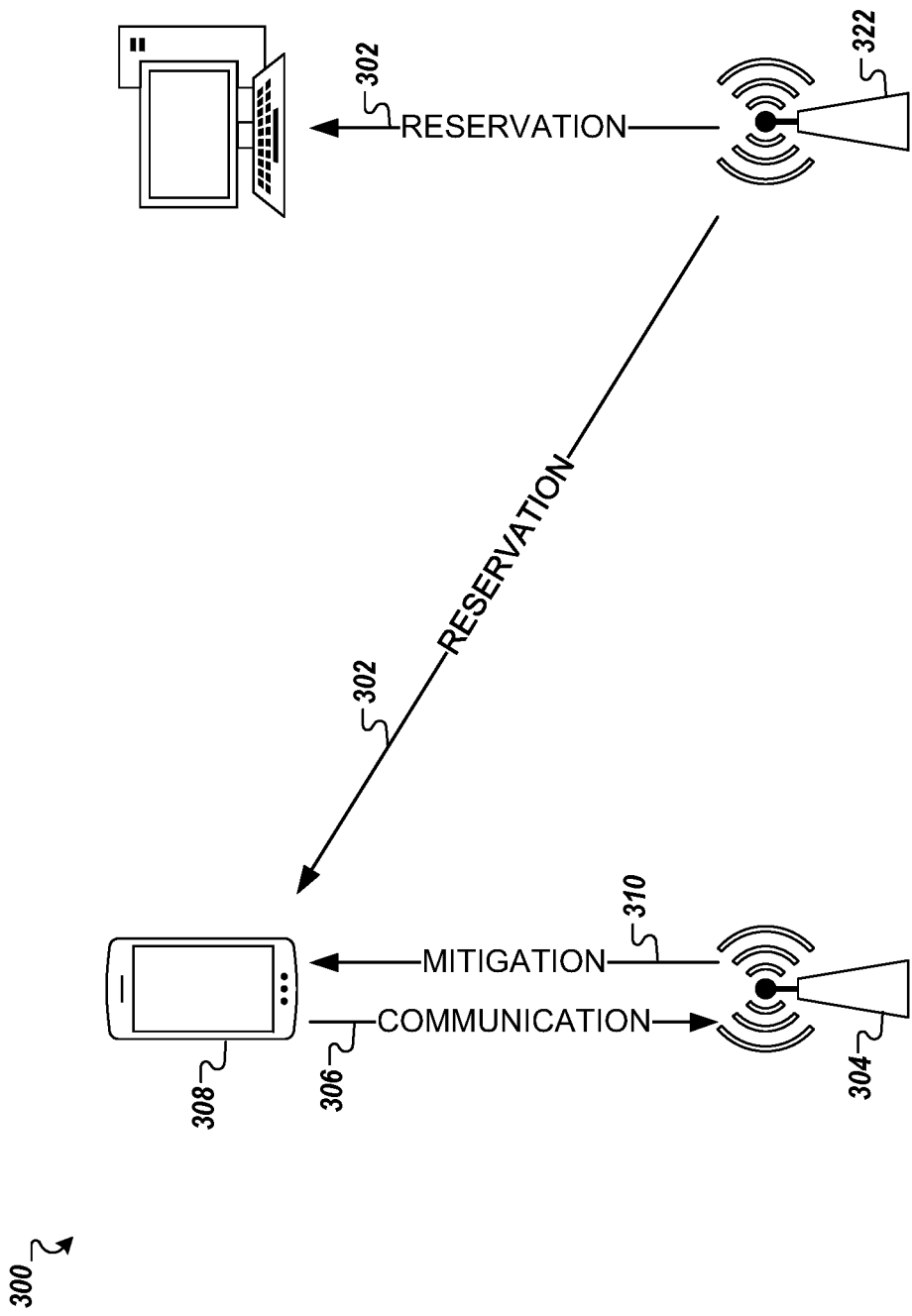
FIG. 3 depicts an interaction diagram illustrating wireless devices that may detect and mitigate aggressive reservations, according to some embodiments.

FIG. 3 depicts an interaction diagram 300 illustrating wireless devices that may detect and mitigate aggressive reservations, according to some embodiments. FIG. 3 depicts wireless device 322 transmitting reservations 302 to reserve a communication medium for use by wireless device 322. Wireless device 322 may correspond to base station 122 of FIG. 1. Transmitting reservations 302 may be by communication frames, in some embodiments. Interaction diagram 300 includes communication messages 306, which may include one or more indications of medium reservations received by the device sending the message. In other words, wireless device 308 may transmit communication messages 306 to AP device 304. In some embodiments, wireless device 308 is not an AP device. Wireless device 308 may be a STA device. AP device 304 may send mitigation instructions 310 responsive to receiving communication messages 306 from wireless device 308. Mitigation instructions 320 may be one or more transmissions including aggressive medium reservation instructions. Devices may utilize various mitigation operations once wireless device 322 has been identified as a device transmitting aggressive medium reservations (i.e., a medium hog). Devices of a spatially overlapping network such as network 102 of FIG. 1 may utilize various mitigation operations once wireless device 322 have been identified as a medium reservation offender, and aggressive reservation device, or the like. In some embodiments, wireless device 308, which may be a STA device, forwards the mitigation instructions on to other wireless devices of the networks 102 and 120 that are within range.

In some embodiments, wireless device 308 and AP device 304 may belong to the same wireless network. Wireless device 308 and AP device 304 may belong to a WLAN network such as first network 102. Wireless device 308 may be in range to detect medium reservations from wireless device 322, which may belong to a different wireless network than wireless device 308. Wireless device 322 may belong to a network such as first network 120 of FIG. 1. Medium reservations from wireless device 322 may be included in frames transmitted my wireless device 322. AP device 304 may not be in range of the reservation messages from wireless device 322. Wireless device 308 may not be configured to initiate aggressive medium reservation mitigation operations. AP device 304 may be configured to initiate aggressive medium reservation mitigation operations. AP device 304 may be configured to recognize aggressive reservations, select an appropriate mitigation response, initiate the mitigation response, and the like. Wireless device 308 may transmit communication message 306 to the AP device 304. Via communication message 306, wireless device 308 may transmit one or more indications of aggressive medium reservations detected by wireless device 308. Communication messages 306 including an indication of aggressive medium reservations may be transmitted to AP device 304 to facilitate AP device 304 initiating aggressive medium reservation mitigation operations.

As part of a mitigation operation, AP device 304 may clear a NAV value associated with a reservation of wireless device 322. With the NAV value cleared, the AP device 304 may no longer retain any instruction to yield the reserved medium to wireless device 322. In some embodiments, a mitigation operation may be performed responsive to a device preparing one or more messages to send to another wireless device. For example, AP device 304 may clear a NAV value in preparation to transmit a message utilizing the reserved medium. In some embodiments, a mitigation operation may be performed by another wireless device of the same network as AP 304, such as wireless device 308. Wireless device 308 may perform a mitigation operation such as clearing a NAV value in preparation to transmit a message utilizing the reserved medium.

In some embodiments, mitigation signal 310 transmitted by AP device 304 may include a frame encoded with an instruction that causes wireless device 308 to utilize a different communication medium than used by wireless device 322. The instructions may cause multiple devices of the wireless network to utilize a different communication medium than that used by wireless device 322. The instructions may cause wireless device 308 to utilize another channel or set of channels, another communication band, or the like. In some embodiments, the mitigation operation includes indicating that a communication medium is free and enabling one or more devices to communicate without delay due to the aggressive medium reservations. In some embodiments, such a mitigation operation enables one or more wireless devices (such as wireless device 108 of FIG. 1) to communicate, despite reservations of the communication medium (e.g., portions of traffic 250 may overlap with reservation 240 as show in FIG. 2). In some embodiments, a mitigation operation includes providing a mitigation signal to a device of the network to indicate that the communication medium is free despite reservation by wireless device 322. AP device 304 may perform a mitigation operation by providing a signal to wireless device 308 indicating that a communication medium is free, despite reservations by wireless device 322.

In some embodiments, the mitigation signal may include a CFend frame sent by AP device 304 to wireless device 308. The CFend frame may cause wireless device 308 to clear its NAV values associated with reservation message(s) 302. In some embodiments, AP device 304 may send the CFend frame at a power level, in a direction, via a communication medium, or the like, such that devices of the network of AP device 304 receive the frame, while devices of the network of wireless device 322 are less likely to receive the frame. For example, AP device 304 may utilize detected signal strength values (e.g., RSSI values) to select an appropriate transmission power for the CFend frame.

In some embodiments, for example if AP device 304 and wireless device 308 are provided by the same vendor, a mitigation signal may include a vendor-specific information element. The vendor-specific information element may encode an instruction to ignore reservations asserted from a device associated with aggressive medium reservations. The mitigation signal may prevent wireless device 308 from yielding the medium to a transmission by wireless device 322 or to any device performing aggressive medium reservations.

In some embodiments, the network including AP device 304 is an 802.11 network associated with a basic service set (BSS) color. The network including AP device 304 may be an 802.11ax network. BSS color is a method for improving wireless network performance in congested environments. A network may be associated with a BSS color, where BSS coloring generally is a method for identifying overlapping basic service sets. Transmissions from devices of the network may include an indication of the network color. Devices of the network and devices within transmission range of the network may treat received transmissions differently depending on the associated color. Devices of the network and devices within transmission range of the network may treat be configured to perform target operations based on the color of the network of the originating device, which is indicated within the transmission. For example, a first device may be configured to yield a communication medium responsive to transmissions having a lower signal strength if the transmissions originate from a second device of the same BSS color, which may serve to reduce collisions in frequency space among the same network. The first device may be configured not to yield a communication medium responsive to receiving a transmission at the same signal strength if the transmission originates from a device with a different BSS color than the first device, which may serve to increase simultaneous transmissions in nearby networks.

In some embodiments, a device recognized to be providing aggressive medium reservations may not be associated with a BSS color. For example, the network associated with wireless device 322 may be an 802.11ac network. In such cases, AP device 304 may clear its own NAV values and transmit one or more frames including a mitigation signal including instructions that cause wireless device 308 and/or other wireless devices of the network to ignore future reservations from the address of wireless device 322. If the device that is the source of aggressive medium reservations is also of a network associated with a BSS color, AP device 304 may conduct mitigation operations. If wireless device 322 is also of an 802.11ax network, AP device 304 may conduct mitigation operations to cause the devices of the network associated with AP device 304 (that includes wireless device 308) to clear their NAVs and ignore subsequent reservations associated with the address of wireless device 322. AP device 304 may transmit instructions to wireless device 308 to ignore subsequent reservations associated with the BSS color of wireless device 322. If wireless device 322 is associated with the same BSS color as AP device 304, AP device 304 may set a new BSS color for the associated network and ignore reservations associated with the BSS color of wireless device 322.

In some embodiments, such as in automotive or other networks where devices of the network are in close proximity to each other, mitigation operations may include radio frequency (RF) and/or physical layer (PHY) techniques to mitigate reception of frames including aggressive medium reservations. For example, de-sense techniques, interference techniques, or the like may enable devices of the network to operate without contention delay due to aggressive medium reservations. Interference techniques may include transmitting a message at the same time and frequency as an anticipated aggressive reservation message, to prevent a device from accurately receiving the aggressive reservation message. In some embodiments, such techniques may make devices more likely to receive transmissions from devices of the same network. Such techniques may cause devices to be more likely to receive transmissions from devices within a target geographic region.

Figure 4:
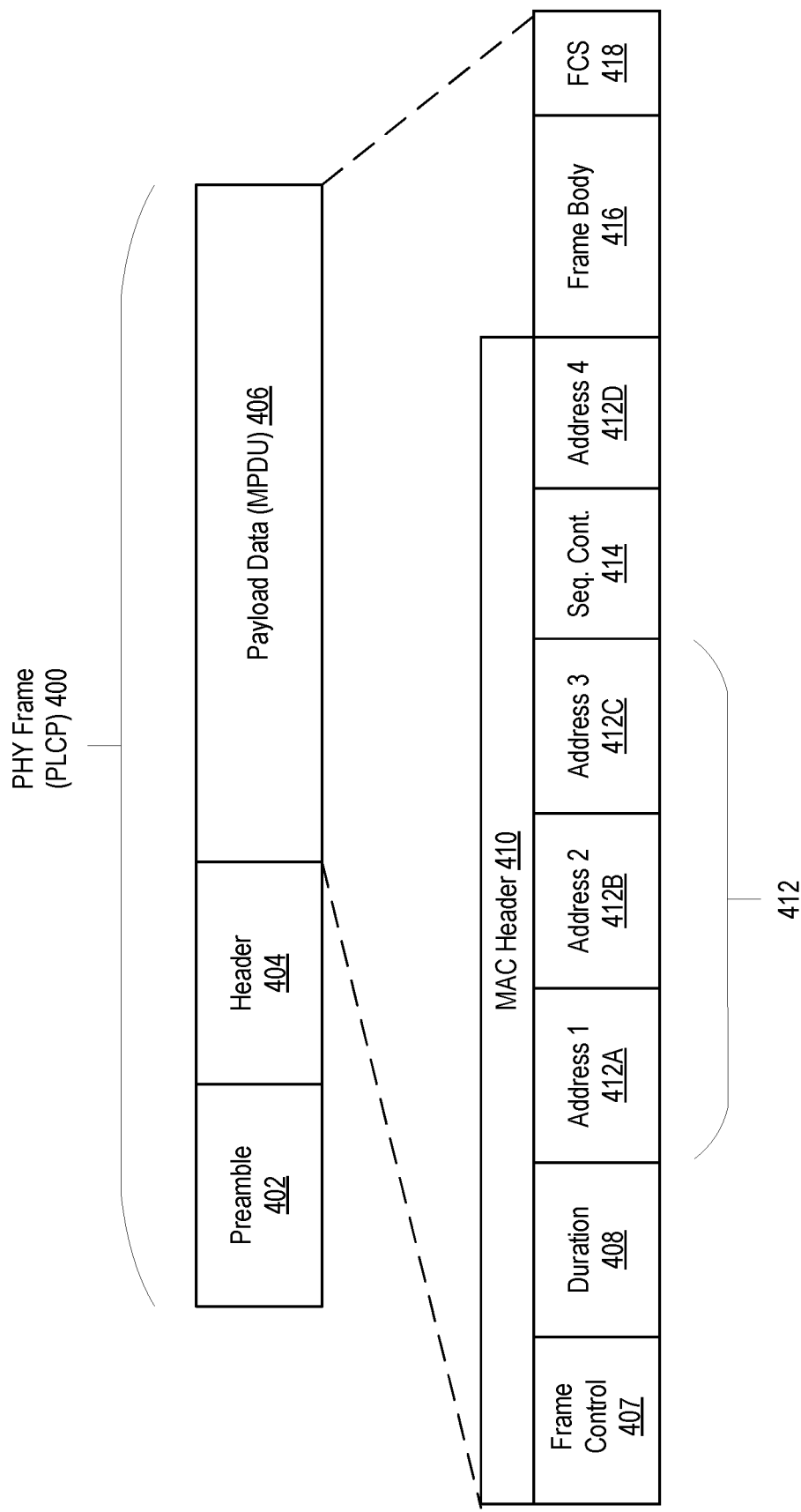
FIG. 4 is a block diagram of a physical (PHY) frame, according to some embodiments.

FIG. 4 is a block diagram of a physical (PHY) frame 400, according to some embodiments. PHY frame 400 may be in accordance with the physical layer convergence protocol (PLCP). PHY frame 400 may include a preamble 402, a header 404, and a payload 406. Payload data 406 may conform to MAC protocol data unit (MPDU) standards. The payload data 406 of PHY frame 400 may include a medium access control (MAC) header 410. MAC header 410 may include various fields that may be used in detecting reservation patterns by an AP device. In some embodiments, data indicative of data transmitted via PHY frame 400 may be transmitted from a STA device to an AP device, to facilitate the AP device initiating aggressive medium reservation mitigation operations. Data indicative of a message received by a device that is not an AP device may be transmitted to an AP device, to facilitate the AP device initiating aggressive medium reservation mitigation operations.

MAC header 410 may include a variety of fields. For example, frame control field 407 may include data indicating the protocol version and frame type and/or subtype of the PHY frame 400, duration field 408 may include a reservation duration, address fields 412 may include the MAC addresses of a transmitter and one or more receivers associated with PHY frame 400, etc. Sequence control field 414 may include information identifying the frame. Frame body 416 may include the message to be communicated between wireless devices using PHY frame 400. Frame check sequence (FCS) 418 may be utilized for error detection.

MAC frames used to reserve a channel may be management frames, control frames, data frames, or a combination of frame types/subtypes. In some embodiments, a device performing aggressive reservation operations may utilize a no acknowledgement (ACK) action (NACK) subtype of management frames for channel reservations. MAC frames may be used by a wireless device to mitigate aggressive medium reservations, to communicate aggressive medium reservations to facilitate mitigation operations, or the like. For example, a device performing mitigation operations may broadcast a CFend control frame to cause devices of the same network as the AP device to clear NAV values. The devices may then be free to communicate utilizing the aggressively-reserved medium. In some embodiments, a wireless device of a network may detect aggressive medium reservations. The wireless device may transmit one or more frames including data indicative of the aggressive medium reservations to an AP device. Responsive to receiving the indication of the aggressive medium reservations, the AP device may employ aggressive medium reservation mitigation operations. The aggressive medium reservation mitigation operations may allow devices of a wireless network, including the device that detected the aggressive medium reservations, to communicate more effectively.

Figure 5A:
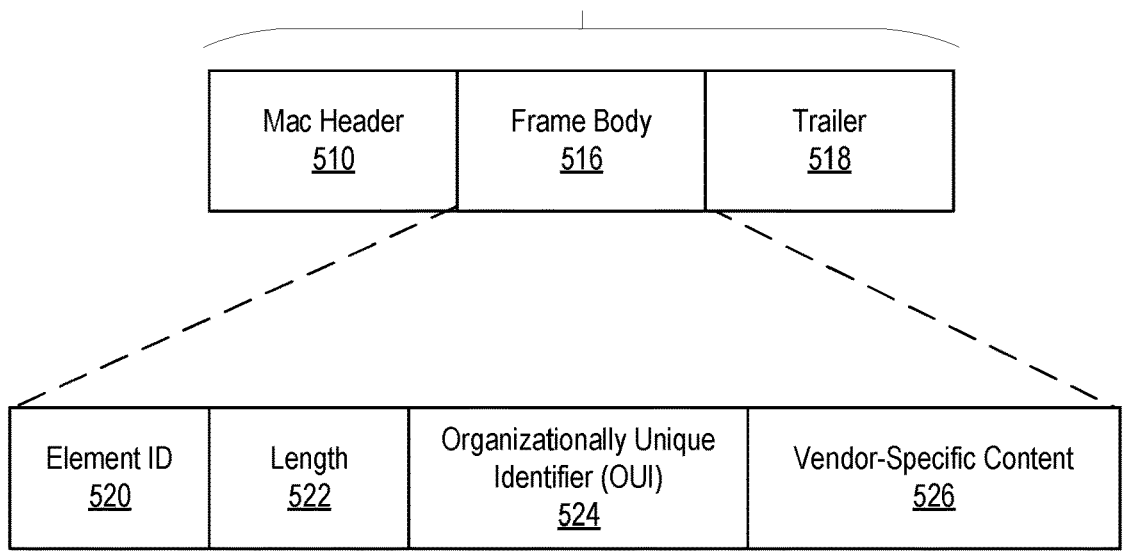
FIG. 5A is a block diagram of a payload data portion of an action PHY frame, according to some embodiments.

FIG. 5A is a block diagram of a payload portion 506 of an action PHY frame, according to some embodiments. Payload data 506 may include a MAC header 510, such as MAC header 410 of FIG. 4. Payload data 506 may include a frame body 516, such as frame body 416 of FIG. 4. Payload data 506 may include a trailer 518, such as FCS 418 of FIG. 4. In some embodiments, frame body 516 includes vendor-specific information, e.g., information not defined in 802.11 standard protocols for management/action frames. In some embodiments, a station device may form a communication connection with an AP device, such as the AP device 104 in FIG. 1. The station device may be configured to transmit data indicating detected medium reservations to the AP device. The station device may transmit data indicating detected medium reservations to the AP device to facilitate the AP device initiating aggressive medium reservation mitigation operations. The station device may utilize the vendor-specific information element action frame format of the 802.11 protocols to transmit the reservation data to the AP device.

In some embodiments, the AP device 104 initiates aggressive medium reservation mitigation operations. The aggressive medium reservation mitigation operations may include transmitting instructions to other devices of the same first wireless network 102 as the AP device 104. The aggressive medium reservation mitigation operations may include transmitting instructions to one or more STA devices of the same network as AP device 104. Instructions may include, for example, instructions to clear NAV value(s) associated with an aggressive medium reservation, instructions to communicate via a different medium, and the like. Messages associated with aggressive medium reservation mitigation operations may be transmitted by the AP device 104 via vendor-specific information elements of action frames.

Frame body 516 may include element ID 520. Element ID 520 may specify the type of data included in the frame body. Element ID 520 may specify that frame body 516 comprises a vendor-specific information element. Length 522 may indicate how much data is included in frame body 516. Organizationally unique identifier (OUI) 524 and vendor-specific content 526 may be specified by a vendor, such as an equipment manufacturer, programmer, etc. In some embodiments, a station device such as the wireless device 108 (FIG. 1) may utilize a vendor-specific content field 526 of a vendor-specific frame body to transmit, to an AP device, information indicative of aggressive medium reservations received by the station device. In some embodiments, an AP device transmits a signal for aggressive medium reservation mitigation, wherein instructions for one or more station devices are contained in the vendor-specific content field 526 of a vendor-specific frame body.

Figure 5B:
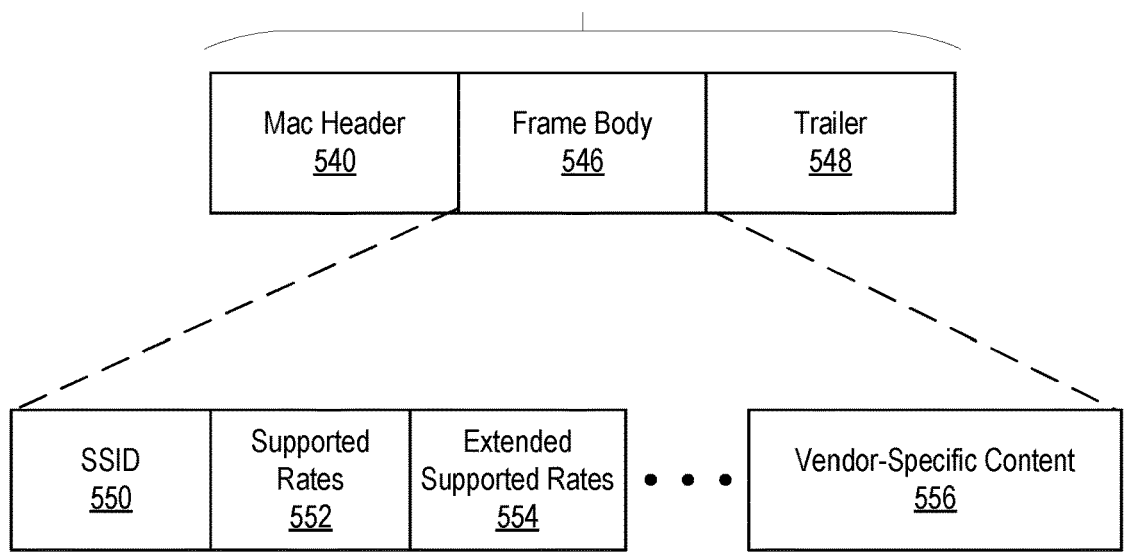
FIG. 5B is a block diagram of a payload data portion of a probe request, according to some embodiments.

FIG. 5B is a block diagram of a payload data portion 536 of a probe request, according to some embodiments. A probe request may be a request to initiate a communication connection between two devices. Payload data 536 may include MAC header 540, such as MAC header 410 of FIG. 4. Payload data 536 may include frame body 546, such as probe request frame body, frame body 416 of FIG. 4, or the like. Payload data 536 may include trailer 548, such as FCS 418 of FIG. 4. Payload data 536 may share one or more features in common with payload data 506 of FIG. 5A.

Frame body 546 may include a number of fields. Fields included in frame body 546 may vary; a few example fields 550 through 556 are shown in FIG. 5B for purposes of explanation. Fields may provide information related to the probe request. For example, fields may include service set identifier (SSID) 550, which may serve to identify a network associated with the device transmitting message containing frame body 546. Supported rates field 552 may contain information ensuring that wireless devices requesting a connection are compatible. Extended supported rates field 554 may provide additional information as a continuation of information given by the supported rates field 552 if, for example, more rates are supported than the size of supported rates field 552 allows to be included. Many other fields may exist within frame body 546 of a probe request frame, including a vendor-specific content field 556.

In some embodiments, a STA device, such as wireless device 108 of FIG. 1, receives one or more aggressive medium reservations. The STA device may belong to a different network than the originator device of the aggressive medium reservations. For example, the wireless device 108 may belong to first network 102 of FIG. 1, and the originator device may be base station 122 of FIG. 1, belonging to second network 120 of FIG. 1. The wireless device 108 may not be connected to the AP device 104 of the first wireless network 102. For example, the communication connection may have been interrupted due to one or more transmissions of the originator device or other devices, such as devices of second network 120 of FIG. 1. A wireless device may utilize the vendor-specific content field 556 of a probe request to communicate data indicative of the aggressive medium reservations to an AP device of the wireless network. For example, wireless device 108 may utilize the vendor-specific content field 556 of a request sent to initiate a communication connection with AP device 104 to communicate data indicative of an aggressive medium reservation to AP device 104. In some embodiments, the AP device 104 may initiate aggressive medium reservation mitigation operations. The mitigation operations may include instructions transmitted to one or more other devices of a first wireless network or a second wireless network, such as networks 102 and 120. In some embodiments, if the AP device 104 and one or more target STA devices are not connected, the AP device 104 transmits mitigation instructions via a vendor-specific content field 556 of a probe response. A probe response may include similar elements to a probe request, as depicted in FIG. 5B.

Figure 6:
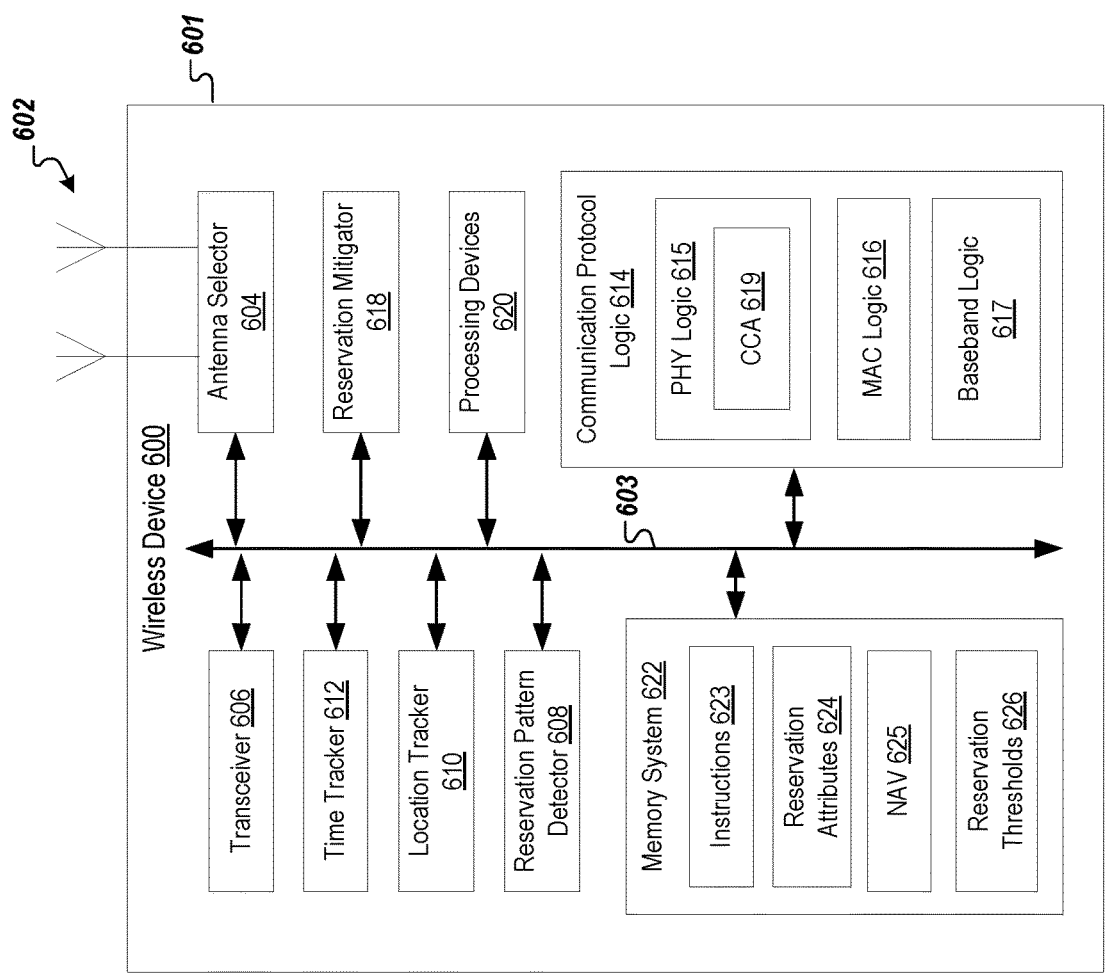
FIG. 6 is a block diagram illustrating a wireless device, according to some embodiments.

FIG. 6 is a block diagram illustrating a wireless device 600, according to some embodiments. Some or all components of wireless device 600 may be implemented in an AP device, a STA device, etc. In some embodiments, initiating aggressive medium reservation operations may be performed by an AP device. In some embodiments, detection of aggressive medium reservations may be performed by one or more STA devices. Components of wireless device 600 may be utilized to detect and/or mitigate patterns of channel reservations. Components of wireless device 600 may be utilized to detect and/or mitigate patterns of channel reservations from devices outside of the network.

Wireless device 600 may be disposed on a substrate 601 such as a printed circuit board (PCB). Bus system 603 may include inter-chip busses, intra-chip busses, coexistence busses, or any other communication lines that connect the circuits and/or logic blocks, which may be disposed on an integrated circuit (IC) chip or discrete IC chips.

In some embodiments, processing devices 620 are used to implement operations of wireless device 600 utilizing instructions 623 and/or data structures organized within memory system 622. Instruction 623 may be implemented as firmware, microcode, or another form of instructions. Although shown as single blocks, processing devices 620, memory system 622, or other components of wireless device 600 may include multiple shared or dedicated resources distributed among the various blocks of wireless device 600 to implement all or a part of operations of one or more of the various blocks. Examples of processing devices and memory systems such as may be used in connection with wireless device 600 are described in more detail in connection to FIG. 8.

Wireless device 600 may include or be coupled to antennas 602 through antenna selector 604. Antenna selector 604 may include selection logic known in the art. Antenna selector 604 may select an antenna of antennas 602 and couple the selected antenna to transceiver 606 for radio frequency (RF) signal reception and/or transmission. In some embodiments, a different number of antennas may be present than depicted in FIG. 6. For example, in some embodiments, antenna selector 604 may couple wireless device 600 to one or more antenna arrays and/or antenna clusters including any number of antennae exclusively paired with or shared among communication protocol logic 614. As another example, wireless device 600 may include a single antenna, such as a multi-in multi-out (MIMO) antenna.

Transceiver 606 facilitates transmitting and receiving RF signals according to one or more communication protocols. When operating as a receiver, transceiver 606 may process received RF signals in the analog domain, digitize the received signals, demodulate corresponding digital data, and provide a decoded sequence (e.g., 1s and 0s) to other components of wireless device 600 (e.g., communication protocol logic 614). Components of wireless device 600 may perform further processing for distribution of data to other components of wireless device 600. When operating as a transmitter, transceiver 606 generally performs such operations in reverse. When operating as a transmitter, transceiver 606 may receive a digital signal from communication protocol logic 614, modulate the signal, and output an analog signal for transmission by one or more of antennas 602.

Location tracker 610 and time tracker 612 may be used to track geographical locations and time values, respectively, associated with wireless device 600. Location tracker 610 may include global positioning system (GPS) circuitry (not shown) to detect GPS coordinates. Alternatively or additionally, location tracker 610 may use triangulation techniques based on signals received from AP devices or other location finding techniques known in the art to determine location of wireless device 600. Time tracker 612 may, for example, utilize a system clock circuitry (not shown) to track time or access remotely generated time values.

Communication protocol logic 614 may include instructions and hardware to support communication protocols defined by one or more communication protocol standards. Communication protocol standards may include operating wireless device 600 according to WLAN, personal area network (PAN), LTE, etc., communication protocols. PHY logic 615 may include dedicated circuitry and/or processor executed instructions to implement all or portions of electrical and physical specifications of a communication protocol. PHY logic 615 may define relationships between wireless device 600 and a transmission medium. For example, PHY logic 615 may establish and terminate connections, provide contention resolution and flow control, and provide modulation, demodulation, and/or conversion between digital data and corresponding wirelessly communicated signals. PHY logic 615 may use techniques known in the art to detect an RSSI value associated with an RF signal observed at an antenna during reception of a packet's preamble, such as preamble 402 of FIG. 4. PHY logic 615 may encode the detected RSSI value in a header of the same packet and/or store the RSSI value in memory system 622.

In some embodiments, PHY logic 615 includes clear channel assessment (CCA) logic 619 that measures the energy of radio frequency signals received through the transceiver 606 to provide physical carrier sensing. To implement physical carrier sensing, CCA logic 619 may detect the presence or absence of 802.11 frames. In some embodiments, an incoming PHY frame whose PLCP header can be successfully decoded by the PHY logic 615 may cause CCA logic 619 to report the medium as busy for the time calculated for the frame transmission to complete. To implement physical carrier sensing, CCA logic 619 may also measure the power of RF energy in the medium. Power of RF energy may include ambient energy, interference sources, and/or unidentifiable WLAN transmissions, for example in a target wireless communication frequency channel. If the energy level detected is greater than a threshold energy level, the channel may be determined to be busy. If CCA logic 619 does not determine that the channel is busy, CCA logic 619 may determine that the channel is idle.

MAC logic 616 may include dedicated circuitry and/or processor executed instructions to implement all or portions of the functional and procedural means to transfer data between network entities. In some embodiments, MAC logic 616 may work in conjunction with PHY logic 615 and antennas 602 to focus energy toward a receiver according to 802.11 transmit beamforming techniques. MAC logic 616 may facilitate narrowband transmissions to receivers within a selected channel to intensify frame power at the receiver. In some embodiments, MAC logic 616 inspects MAC frame fields for information that can be used by the wireless device 600 to implement virtual carrier sensing and to detect and/or mitigate aggressive medium reservations. MAC frames used as reservation signals may be management frames, control frames, data frames, or a combination of frame types or subtypes. MAC logic 616 may parse the MAC header to determine frame type, associated MAC addresses, and reservation duration, and store these values in memory as reservation attributes 624 for use by logic such as the reservation pattern detector 608 and/or the reservation mitigator 618.

In some embodiments, a device may include logic, instructions, hardware, etc., configured to receive and decode medium reservations. MAC logic 616 may be utilized to extract and store reservation information associated with frames received by the device. The STA device may further be configured to transmit data associated with received and decoded reservations to an AP wireless device. MAC logic 616 may include instructions to facilitate a STA device transmitting data associated with reservations to an AP device. The station device may include reservation pattern detector 608, or the STA device may transmit one or more messages indicative of received reservation signals to the AP device and the AP device may use reservation pattern detector 608 to detect aggressive patterns of medium reservations. In some embodiments, an AP device may not receive aggressive medium reservations from the device transmitting the aggressive medium reservations. For example, the AP device may be out of range of the device transmitting the aggressive medium reservations. The AP device may be configured to receive, from a wireless device sharing a network with the AP device, one or more messages indicative of the medium reservations. In some embodiments, the indication of the medium reservations may be included in a vendor-specific information element of an action frame. In some embodiments, the indication of the medium reservations may be included in a vendor-specific information element of a probe frame. The AP device may decode the one or more messages indicative of medium reservations. The AP device may utilize reservation pattern detector 608 to determine if the reservations comprises a pattern of aggressive medium reservations. The AP device may utilize reservation mitigator 618 in view of instructions 623, reservations attributes 624, reservation thresholds 626, etc., to determine and execute one or more aggressive medium reservation mitigation operations. The AP device may transmit instructions, interference, or the like to one or more wireless devices of the network to facilitate mitigation of the aggressive medium reservations. The AP device may transmit messages to STA devices of the same network as the AP device to facilitate mitigation of the aggressive medium reservations.

To implement virtual carrier sensing, MAC logic 616 may extract the duration field value from MAC headers and save it as a NAV value 625 in memory system 622 to mark a medium as busy for the amount of time specified in the duration field. MAC logic 616 may subsequently count down the NAV value and consider the channel to be busy or reserved for as long as the NAV value is non-zero. MAC logic 616 may also update the NAV value, or clear the NAV value stored in memory system 622 responsive to subsequent frames and/or mitigation signals.

In some embodiments, wireless device 600 may be 802.11ax compatible and associated with a basic service set (BSS) color. Wireless device 600 may encode and decode BSS color information at the PHY layer and/or the MAC sublayers. For example, PHY logic 615 may encode and/or decode BSS color information in the SIG-A field of the 802.11ax PHY header. MAC logic 616 may encode and/or decode BSS color information in the high efficiency (HE) operation information element of MAC management frames.

Communication protocol logic 614 may include baseband logic 617 that includes dedicated circuitry and/or processor executed instructions to manage physical channels and links and other services like error correction, data whitening, hop selection and security according to target communication protocol standards (e.g., Bluetooth (BT) communication protocol standards). Baseband logic 617 may include a link controller that works with a link manager in upper protocol layers to carry out link-level routines like link connection and power control. Baseband logic 617 may also manage asynchronous and synchronous links, handle packets and do paging and inquiry to access and inquire wireless communication devices in the area.

In some embodiments, collaborative coexistence hardware mechanisms and algorithms enable communication subsystems to operate concurrently and/or simultaneously. For example, wireless device 600 may be included on a system on a chip that includes BT communication resources coupled via coexistence interface(s) to WLAN communication resources.

Collaborative coexistence techniques provide a methodology by which communication resources for multiple communication protocols may be collected on a device. Collaborative coexistence techniques may be particularly useful for small form-factor devices. Coexistence solutions may be implemented at the chip level, the board level, the software level, and/or through antennas. In some embodiments, collaborative coexistence between WLAN, BT, and/or Zigbee subsystems may be implemented by Packet Traffic Arbitration (PTA) logic (not shown) using PTA's prioritization approaches between data types and applications and/or other arbitration algorithms to pursue optimum performance for the particular circumstances and design constraints of a multi-network communication system. Through PTA embodiments, overall quality for simultaneous voice, video, and data transmission on an embedded system can be achieved. In some embodiments, reservation patterns detected according to the embodiments described herein may be shared as part of a coexistence operation for communication by one or more of the multiple communication resources supported by wireless device 600.

Reservation pattern detector 608 may perform operations associated with medium reservations by another wireless device. In some embodiments, reservation pattern detector 608 may detect channel reservations. In some embodiments, reservation pattern detector 608 may designate one or more reservations as comprising a pattern of aggressive medium reservations. In some embodiments, reservation pattern detector 608 may designate a wireless device transmitting one or more medium reservations as an offender. A device transmitting one or more medium reservations may be flagged to be treated as a device that transmits aggressive medium reservations. Reservation pattern detector 608 may retrieve and use attributes associated with reservations to detect aggressive reservations. Reservation pattern detector 608 may be implemented by dedicated hardware and/or by processing instructions 623. Reservation pattern detector 608 may be implemented in whole or in part by transceiver 606, communication protocol logic 614, reservation mitigator 618, and/or by processing instructions 623 stored in memory system 622.

In some embodiments, reservation pattern detector 608 may include analog and/or digital logic and/or measurement circuitry to determine attributes associated with reservations signals. Reservation pattern detector 608 may obtain reservation attributes by receiving RF signals. Reservation pattern detector 608 may also receive and/or count packets communicated on a channel to obtain reservation signal attributes. For example, reservation pattern detector 608 may retrieve from the communication protocol logic 614 or memory system 622 reservation duration values, transmit opportunity values, SSID to which the sender and receiver belong, and/or channel identifiers associated with reservations. Such data may be retrieved from memory system 622 as reservation attributes 624. Reservation pattern detector 608 may also utilize counter logic (not shown) to count a number of frames, timing circuitry (not shown) to calculate repetition intervals, and various reservation threshold values 626 stored in the memory system 622 to recognize aggressive reservation patterns.

In some embodiments, reservation pattern detector 608 may be triggered to initiate reservation pattern detection based on various events or conditions. Such events or conditions may be received from a remote device and/or stored as an array in memory system 622. For example, reservation pattern detector 608 may begin to detect reservation patterns in response to proximity of wireless device 600 to a particular geographical location detected by location tracker 610, a detected level of congestion or interference, a detected level of contention delay, and/or a particular time of day detected by time tracker 612.

Reservation mitigator 618 may mitigate contention delay caused by aggressive channel reservations. Once a wireless device (e.g., base station 122 of FIG. 1) has been designated as an offender, reservation mitigator 618 may provide one or more of a variety of mitigation operations for wireless device 600 itself and/or for one or more other wireless devices in the same network. In some embodiments, mitigation operations may be initiated without flagging a wireless device as an offender. In some embodiments, a pattern of aggressive reservations may be mitigated without logic tying the mitigation to a source device. Mitigation operations may cause wireless device 600 to ignore certain channel reservations asserted by an out-of-network device. Mitigation operations may include signaling one or more other wireless devices. Mitigation operations may include transmitting instructions for one or more devices to ignore certain channel reservations. Reservation mitigator 618 may be implemented by dedicated hardware and/or by processing instructions 623. Mitigation operations may include reservation mitigator 618 transmitting a mitigation signal at a selected time, power, length, direction, and/or frequency that interferes with the other wireless device's reception of a subsequent frame. Mitigation operations may include reservation mitigator 618 causing transmission of a mitigation signal that interferes with another device's reception of a medium reservation.

Figure 7A:
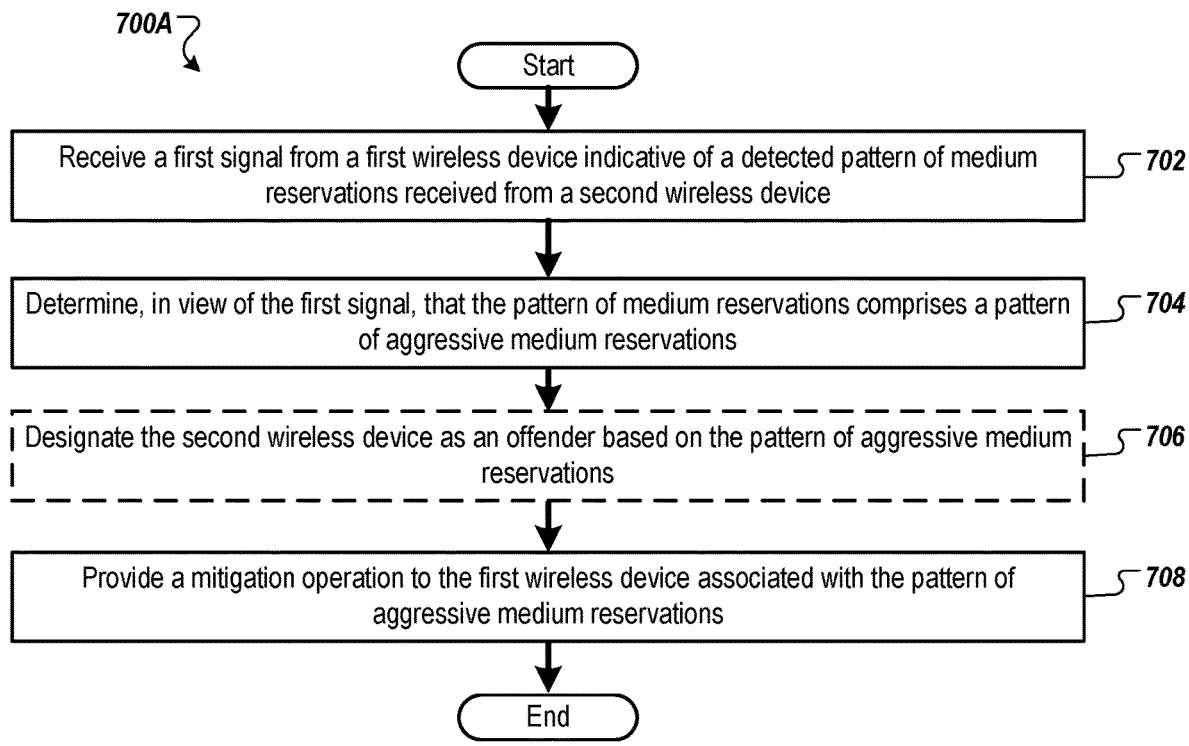
FIG. 7A is a flow diagram of a method for receiving and mitigating aggressive medium reservations, according to some embodiments.

FIG. 7A is a flow diagram of a method 700A for receiving and mitigating aggressive medium reservations, according to some embodiments. At block 702, an AP wireless device receives a first signal from a first wireless device such. The AP wireless device may be AP device 104 of FIG. 1. The first wireless device may be a STA device, such as wireless device 108 of FIG. 1. The first signal is indicative of a pattern of medium reservations received by the first wireless device from a second wireless device. The pattern of medium reservations. In some embodiments, the first wireless device is a STA device. In some embodiments, the first wireless device is not an AP device. In some embodiments, the first wireless device is not configured to initiate reservation mitigation operations. In some embodiments, the first wireless device is not configured to determine whether one or more medium reservations is a pattern of aggressive medium reservations. In some embodiments, the indication of the detected pattern of reservations is included in a vendor-specific information element. An indication of a detected pattern of reservations may be included in vendor-specific content 526 of frame body 516 of an action frame, as depicted in FIG. 5A, or vendor-specific content 556 of a probe request frame, as depicted in FIG. 5B, or the like.

In some embodiments, the first wireless device (e.g., wireless device 108 of FIG. 1) may transmit the signal indicative of a pattern of transmissions received from the second device (e.g., base station 122 of FIG. 1). The first wireless device may transmit the signal responsive to determining that the second wireless device is a hidden node with respect to the AP device. The first wireless device may determine that the second wireless device is a hidden node with respect to the AP device in view of transmissions received from the AP device 104 and the second wireless device. The first wireless device may detect a first transmission (prior to transmitting the signal to the AP device) from the second wireless device and a second transmission from the AP device that conflict in time, and determine that the second wireless device is a hidden node with respect to the AP device in view of the conflicting messages. For example, the first wireless device may detect that a transmission from the second wireless device conflicts in time with a transmission from the AP device. In some embodiments, the AP device performs mitigation operations based on the presence of a hidden node, with respect to the AP device, rather than strictly an aggressive reservation pattern.

At block 704, the AP device 104 determines, in view of the first signal, that the pattern of medium reservations is a pattern of aggressive medium reservations. Processing logic of the AP device 104 may perform the determination. In some embodiments, logic associated with reservation pattern detector 608 of FIG. 6 may determine that the pattern is a pattern of aggressive medium reservations. In some embodiments, the AP device 104 may determine that the medium reservations form a pattern of aggressive medium reservations by comparing one or more metrics associated with the reservation(s) to one or more threshold values. Determining that a medium reservation is indicative of a pattern of aggressive medium reservations may include comparing metrics such as length of a reservation, number of frames associated with the reservation, total idle time between reservations, etc., to one or more threshold values or conditions. At block 706, the AP device 104 optionally designates the second wireless device as an offender based on the pattern of aggressive medium reservations.

At block 708, the AP device 104 provides a mitigation operation (or more than one mitigation operations) to the first wireless device, wherein the mitigation operation is associated with the pattern of aggressive medium operations. The mitigation operation may be provided via a second signal. The mitigation operation may be included in a vendor-specific information element of an action frame, a probe response frame, etc.

Figure 7B:
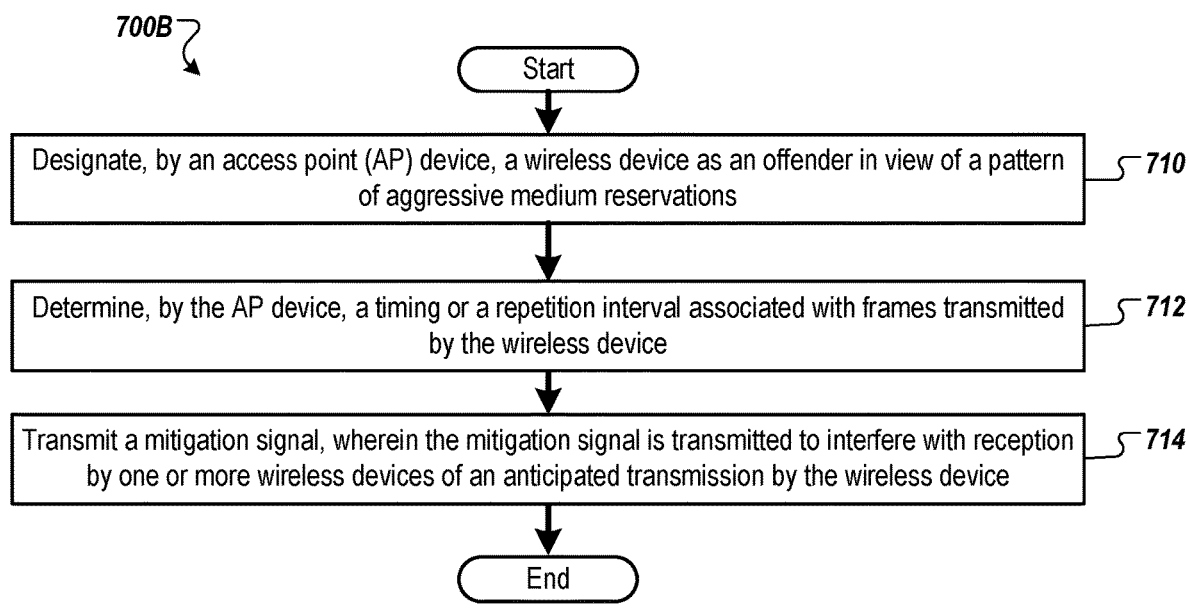
FIG. 7B is a flow diagram of a method for mitigating aggressive medium reservations, according to some embodiments.

FIG. 7B is a flow diagram of a method 700A for mitigating aggressive medium reservations, according to some embodiments. At block 710, an AP wireless device, such as the AP device 104 (FIG. 1), designates a wireless device, such as base station 122 of FIG. 1, as an offender in view of a pattern of aggressive medium reservations. In some embodiments, the AP device (e.g., AP device 104) is associated with a first wireless network, such as first wireless network 102 of FIG. 1. The wireless device may be associated with a second wireless network, such as second wireless network 120 of FIG. 1. The AP device may have received one or more messages indicative of a pattern of medium reservations, as described in connection with FIG. 7A. The AP device may have received the messages from another wireless device of the first wireless network 102. The AP device may have received the messages from a STA device, such as wireless device 108 of FIG. 1.

At block 712, the AP device determines a timing or a repetition interval associated with frames transmitted by the wireless device. In some embodiments, reservation mitigator 618 of FIG. 6 may determine the timing or repetition interval. For example, referring to FIG. 2, the AP device may use an interval 234 associated with frames transmitted by the second wireless device to predict or determine when the wireless device will transmit a subsequent frame.

At bock 714, the AP device (such as AP device 104) transmits a mitigation signal. The mitigation signal is transmitted to interfere with reception of an anticipated transmission. The anticipated transmission is anticipated to be transmitted by the wireless device. The mitigation signal is to interfere with reception of the anticipated reception by one or more wireless devices, such as wireless devices 106 and/or 108 of FIG. 1. The one or more wireless devices may be of the first wireless network 102. The signal may be sent at a time to coincide with an anticipated frame transmission sent by the second wireless device. The signal may be sent at a time based on frame transmissions received from the second device. In some embodiments, the frame transmissions sent from the second device may have been received by one of the wireless devices, such as wireless device 108 of FIG. 1, and data indicative of the transmissions may be sent to the first wireless device by the one of the wireless devices. In some embodiments, the timing, frequency, power, transmission direction, etc., of the mitigation signal may be selected to facilitate interference of the mitigation signal with the anticipated transmission of the second wireless device.

Figure 7C:
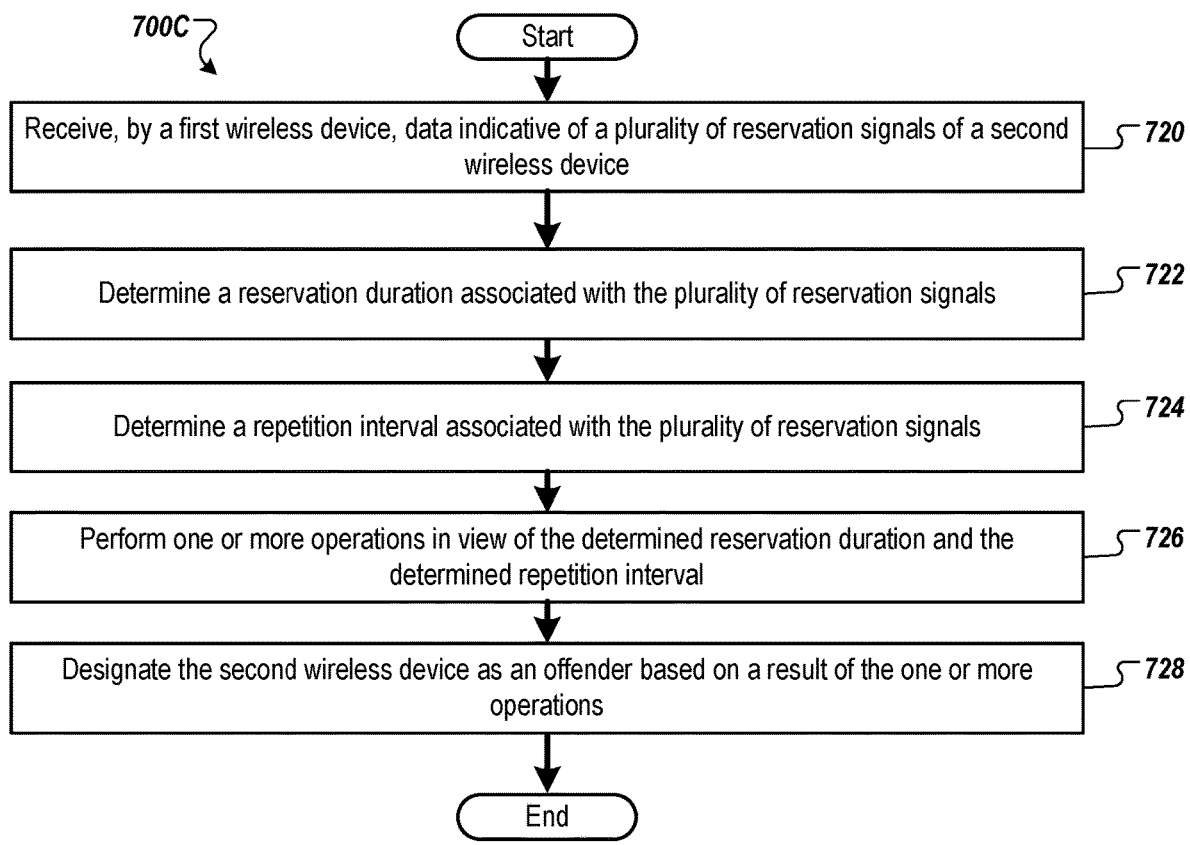
FIG. 7C is a flow diagram of a method for designating a wireless device as an offender, according to some embodiments.

FIG. 7C is a flow diagram of a method 700C for designating a wireless device as an offender, according to some embodiments. At block 720, a first wireless device receives one or more transmissions. The one or more transmissions are indicative of a plurality of reservation signals of a second wireless device. The first wireless device may be an AP device, such as AP device 104 of FIG. 1, or a STA device such as the wireless device 108 The second wireless device may be associated with a different network than the first wireless device, such as base station 122 of FIG. 1, or may be associated with the same network as the first wireless device such as the wireless device 106. The one or more transmissions contain information indicative of reservations received via one or more frames sent by the second wireless device.

At block 722, the first wireless device determines a reservation duration associated with the plurality of reservation signals. The reservation duration associated with each of the reservation signals may be the same or different from each other. In some embodiments, the determined reservation duration may be a result of applying a mathematical or statistical function to one or more metrics associated with the plurality of reservation signals. Determining a reservation duration may be based on metrics such as an average duration, a median duration, etc.

At block 724, the first wireless device determines a repetition interval, such as interval 234 of FIG. 2, associated with the plurality of reservation signals. The interval between signals may be the same or different from one another. Intervals between frames including reservations transmitted by the second wireless device may be the same or different from one another. In some embodiments, the determined repetition interval may be a result of applying a mathematical or statistical function to one or more metrics associated with the plurality of reservation signals.

At block 726, the first wireless device performs one or more operations in view of the determined reservation duration and/or the determined repetition interval. In some embodiments, processing logic of the first wireless device may compare the determined reservation duration to the determined repetition interval. In some embodiments, processing logic may compare the determined reservation duration to a threshold duration value. In some embodiments, the threshold reservation duration is based on a transmit opportunity value that represents the amount of time the second wireless device is allotted to send frames after having won contention for the communication medium. If the reservation duration does not satisfy the threshold condition, the reservation may not be considered aggressive, suspicious, etc., and the first wireless device may proceed to operate normally, to evaluate a subsequent reservation, or the like.

In some embodiments, if the reservation is determined to be aggressive or otherwise suspicious based on the reservation duration, the first wireless device may determine whether an idle duration is less than or equal to a threshold idle duration value. An idle period may be of such length that a wireless device of the network associated with the first wireless device is effectively excluded from utilizing the communication medium over a period of time including the idle period. The threshold idle duration value may be selected to detect a pattern of aggressive reservations that effective causes one or more wireless devices not to contend for use of the communication medium. The threshold idle condition may be selected based on a reservation duration, repetition interval, etc. If the idle duration does not satisfy a threshold condition, the reservation may not be considered suspicious, aggressive, or the like. For example, if the idle duration is longer than a threshold value, the reservation may not be considered suspicious or aggressive. In some embodiments, previous operations may be reversed. For example, an idle duration may be analyzed, and a reservation duration analyzed responsive to the idle duration satisfying a threshold condition.

At block 728, processing logic of the first wireless device designates the second wireless device, such as base station 122 of FIG. 1, as an offender based on the one or more operations. Processing logic of the first wireless device may designate the second wireless device as a device that transmits aggressive medium reservations. For example, if it is determined that the reservation duration meets or exceeds a threshold portion of the repetition interval, the first wireless device may designate the second wireless device as an offender. In another example, processing logic of the first wireless device may designate the second wireless device as an offender if a repetition interval is shorter than a reservation duration. In some embodiments, the first wireless device may delay designating a device as an offender until multiple conditions meeting a threshold are received. The first wireless device may not designate a second device as a defender, in some embodiments, unless multiple reservations satisfying a threshold condition, multiple reservations in a row satisfying a threshold condition, a threshold percentage of reservations in a period of time satisfying the threshold condition, or the like, are received. Responsive to a pattern of aggressive or otherwise suspicious reservations satisfying a threshold condition, the second wireless device may be designated an offender.

Operations of method 700C are described as being performed by one wireless device (e.g., an AP device). In some embodiments, operations of method 700C may be performed by multiple devices. Determining a reservation duration may be performed by the third wireless device, determination of a repetition interval may be performed by the third wireless device, etc.

Figure 8:
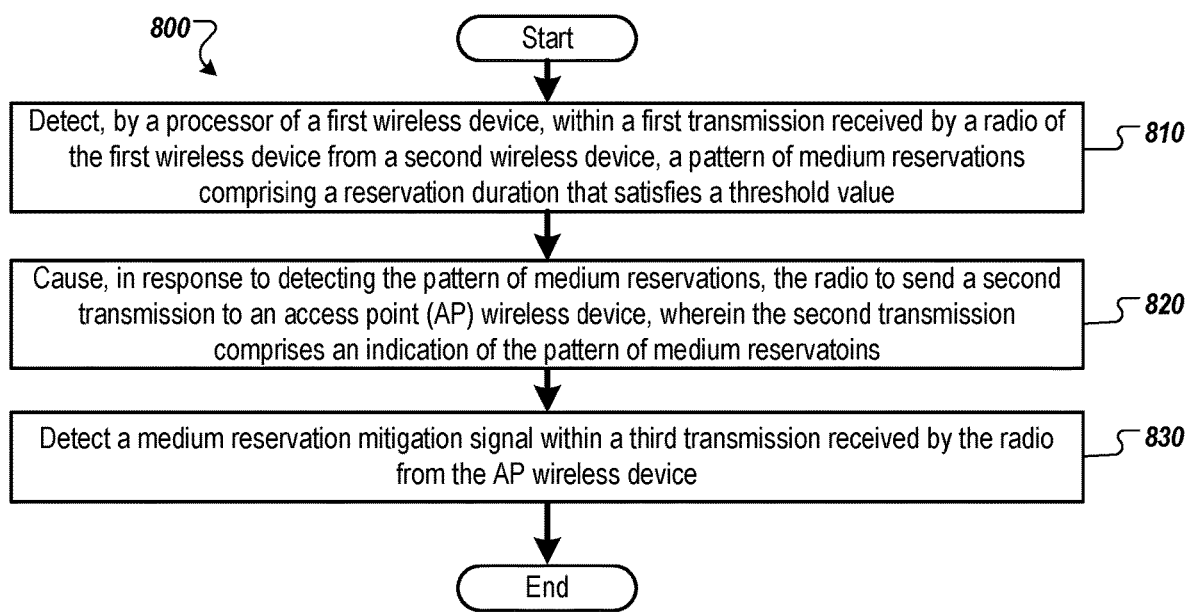
FIG. 8 is a flow diagram of a method for facilitating aggressive medium reservation mitigation operations, according to some embodiments.

FIG. 8 is a flow diagram of a method 800 for facilitating aggressive medium reservation mitigation operations, according to some embodiments. At block 810, processing logic of a first wireless device detects information within a first transmission received from a second wireless device. The first wireless device may be a STA device of a network, such as wireless device 108 of first network 102 of FIG. 1. The second wireless device may be an originator device such as the base station 122 of FIG. 1. The first transmission may be received by the transceiver 606 of the first wireless device. The information within the first transmission may include a pattern of medium reservations. The pattern of medium reservations may include a reservation with a duration that satisfies a threshold condition. The threshold condition may be related to a determination that the pattern of medium reservations is tying up the communication medium such as a channel.

In some embodiments, the first wireless device may have also detected a first prior transmission from the second wireless device, such as base station 122 of FIG. 1, and a second prior transmission from an AP wireless device, such as AP device 104 of FIG. 1. In some embodiments, the first prior transmission and the second prior transmission may conflict in time.

At block 820, processing logic of the first wireless device, in response to detecting the pattern of medium reservations, causes the transceiver 606 to send a second transmission to the AP wireless device, such as AP device 104 of FIG. 1. The second transmission may include an indication of the pattern of medium reservations. In some embodiments, the first wireless device may transmit a plurality of transmissions to the AP wireless device, each of which may include indications of one or more of the patterns of medium reservations. In some embodiments, the second transmission includes information indicative of the pattern of media reservations located within a vendor-specific field of an action frame. For example, the second transmission may include information indicative of the pattern of media reservations located in vendor-specific content field 526 of FIG. 5A. In some embodiments, the second transmission includes information indicative of the pattern of media reservations located within a vendor-specific field of a probe request frame. For example, the second transmission may include information indicative of the pattern of media reservations located in vendor-specific content field 556 of FIG. 5B.

At block 830, processing logic of the first wireless device detects a medium reservation mitigation signal within a third transmission. The third transmission is received by the transceiver 606. The third transmission may be transmitted by the AP wireless device, for example.

In some embodiments, the medium reservation mitigation signal includes instructions which, when executed, cause the first wireless device to communicate with the AP wireless device using a first wireless communication channel. For example, the instructions may instruct the first wireless device to change communication operations to a different channel. The instructions may cause the first wireless device to change communication operations to be performed on a channel not reserved by the second wireless device. In some embodiments, the medium reservation mitigation signal may include instruction which cause the processor to clear a NAV value associated with the pattern of media reservations. The medium reservation mitigation signal may cause the first wireless device to clear a NAV value associated with a medium reservation of the second wireless device. In some embodiments, the medium reservation mitigation signal may include an interference signal transmitted using a communication frequency associated with the first transmission. The medium reservation mitigation signal may be transmitted at a time, power, location, frequency, etc., selected to interfered with a predicted transmission from the second wireless device. In some embodiments, the medium reservation mitigation signal includes instructions preventing the first wireless device from yielding a medium of communication to the second wireless device. In some embodiments, the medium reservation mitigation signal may be included in a probe response frame. In some embodiments, the medium reservation mitigation signal is included in a vendor-specific field of a probe response frame. In some embodiments, the medium reservation mitigation signal is included in an action frame. In some embodiments, the medium reservation mitigation signal is included in a vendor-specific field of an action frame.

Figure 9:
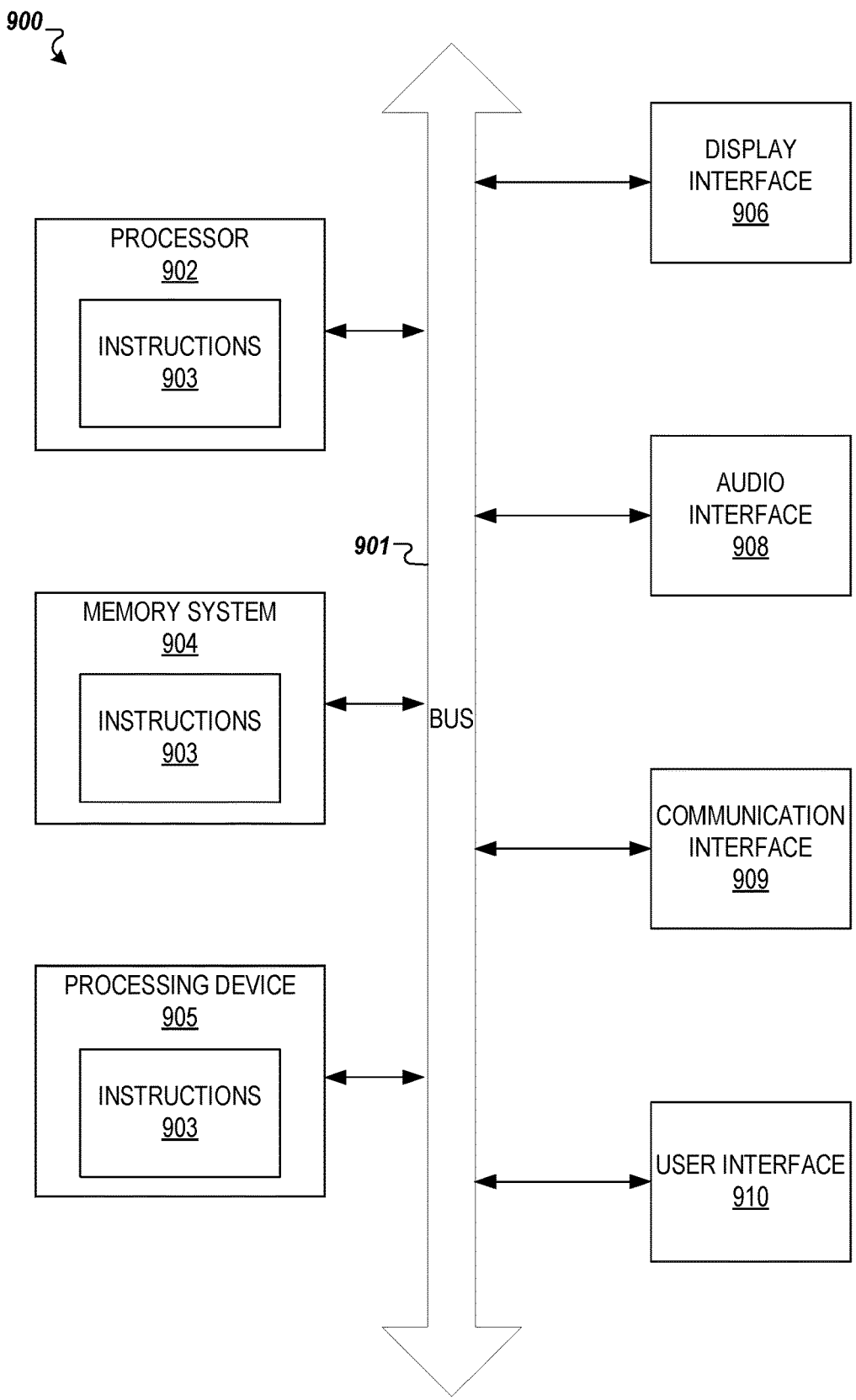
FIG. 9 is a block diagram illustrating an electronic device, according to some embodiments.

FIG. 9 is a block diagram illustrating an electronic device 900, according to some embodiments. Electronic device 900 may be in the form of a computer system within which sets of instruction 903 may be executed to cause electronic device 900 to perform any one or more of the methodologies discussed herein. Electronic device 900 may operate as a standalone device or may be connected (e.g., networked) to other machines. In a networked deployment, electronic device 900 may operate in the capacity of a server or a client machine in a server-client network environment, or as a peer machine in a peer-to-peer or distributed network environment.

Electronic device 900 may be an internet-of-things (IoT) device, a server computer, a client computer, a personal computer, a tablet, a set-top box, a personal digital assistant, a mobile telephone, a web appliance, a network router, switch, or bridge, a television, a handheld multi-media device, a gaming console, or any other machine capable of executing a set of instructions (sequential or otherwise) that specify actions to be taken by that machine. Further, while only a single electronic device 900 is illustrated, the term "device" shall also be taken to include any collection of machines that individually or jointly execute a set (or multiple sets) of instructions to perform any one or more of the methodologies discussed herein.

Electronic device 900 is shown to include processor 902. It will be understood that processor 902 may comprise multiple devices. Processor 902 may include multiple processors, a multi-core processor, etc. Electronic device 900 and/or processor 902 may include processing device 905. Processor 902 may be or include one or more microprocessors, central processing units, application processors, host controllers, special-purpose processors, application specific integrated circuits, field programmable gate arrays, or the like. Bus system 901 may include a communication block (not shown) to communicate with an internal or external component, such as an embedded controller or an application processor, via communication device 909 and/or bus system 901.

Components of electronic device 900 may reside on a common carrier substrate such as, for example, an integrated circuit (IC) die substrate, a multi-chip module substrate, or the like. Components of electronic device 900 may be one or more separate ICs and/or discrete components.

Memory system 904 may include volatile memory and/or non-volatile memory which may communicate with one another via bus system 901. Memory system 904 may include, for example, random access memory (RAM) and program flash. RAM may be static RAM (SRAM), and program flash may be a non-volatile storage, which may be used to store firmware (e.g., control algorithms executable by processor 902 to implement operations described herein). Memory system 904 may include instructions 903 that, when executed, cause performance of methods described herein. Portions of memory system 904 may be dynamically allocated to provide caching, buffering, and/or other memory-based functionalities.

Memory system 904 may include a drive unit providing a machine-readable medium on which may be stored one or more sets of instructions 903 embodying any one or more of the methodologies or functions described herein. Instructions 903 may include software, firmware, etc. Instructions 903 may also reside, completely or at least partially, within the other memory devices of memory system 904 and/or within processor 902 during execution thereof by electronic device 900, which, in some embodiments, constitutes machine-readable media (e.g., computer-readable media). Instructions 903 may further be transmitted or received over a network via communication device 909. In some embodiments, communication device 909 may include one or more communication devices.

While a machine-readable medium is in some embodiments a single medium, the term "machine-readable medium" should be taken to include a single medium or multiple media (e.g., a centralized or distributed database, and/or associated cashes and servers) that store the one or more sets of instructions. The term "machine-readable medium" shall also be taken to include any medium that is capable of storing or encoding a set of instructions for execution by the machine, and that cause the machine to perform any one or more of the example operations described herein. The term "machine-readable medium" shall accordingly be taken to include, but not be limited to, solid-state memories, optical and magnetic media, etc.

Electronic device 900 may further include display interface 906. Display interface 906 may include components such as a liquid crystal display, touchscreen, cathode ray tube, or the like, software and hardware support for display technologies, etc. Electronic device 900 may further include audio interface 908. Audio interface 908 may include components such as one or more microphones, one or more speakers, software and/or hardware supporting the microphones and speakers, etc. Electronic device 900 is also shown to include user interface 910. User interface 910 may include components such as a keyboard, cursor control, buttons, switches, touchpad, touchscreen, and/or associated hardware and software.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A first wireless device, comprising:
   a transceiver; and
   a processor coupled to the transceiver, wherein the processor is to:
   detect, within a first transmission received by the transceiver from a second wireless device via a first wireless communication channel, a pattern of medium reservations comprising a reservation duration that satisfies a threshold duration value;
   cause, in response to detecting the pattern of medium reservations, the transceiver to send a second transmission to an access point (AP) wireless device, wherein the second transmission comprises an indication of the pattern of medium reservations; and
   detect a medium reservation mitigation signal within a third transmission received by the transceiver from the AP wireless device.

2. The first wireless device of claim 1, wherein the processor is further to detect that a first prior transmission received from the second wireless device conflicts in time with a second prior transmission received from the AP wireless device, wherein causing the transceiver to send the second transmission is also in response to detecting the conflict.

3. The first wireless device of claim 1, wherein the medium reservation mitigation signal comprises instructions which, when executed, cause the first wireless device to communicate with the AP wireless device via a second wireless communication channel.

4. The first wireless device of claim 1, wherein the medium reservation mitigation signal comprises instructions, which, when executed, cause the processor to clear a network allocation vector value associated with the pattern of medium reservations.

5. The first wireless device of claim 1, wherein the medium reservation mitigation signal comprises an interference signal transmitted using a communication frequency used for the first transmission.

6. The first wireless device of claim 1, wherein the medium reservation mitigation signal causes the processor to prevent yielding a medium of communication, including at least the first wireless communication channel, to the second wireless device.

7. The first wireless device of claim 1, wherein the indication of the pattern of medium reservations comprises information located within a vendor-specific field of an action frame of the second transmission.

8. The first wireless device of claim 1, wherein the second transmission comprises a probe request to initiate communication with the AP wireless device, and wherein the indication of the medium reservation comprises vendor-specific information within a probe request frame body of the probe request.

9. A method, comprising:
    detecting, by a processor of a first wireless device, within a first transmission received by a transceiver of the first wireless device from a second wireless device, a pattern of medium reservations comprising a reservation duration that satisfies a threshold duration value, wherein the first transmission is received via a first wireless communication channel;
    causing, in response to detecting the pattern of medium reservations, the transceiver to send a second transmission to an access point (AP) wireless device, wherein the second transmission comprises an indication of the pattern of medium reservations; and
    detecting a medium reservation mitigation signal within a third transmission received by the transceiver from the AP wireless device.

10. The method of claim 9, further comprising
    detecting that a first prior transmission received from the second wireless device conflicts in time with a second prior transmission received from the AP wireless device, wherein causing the transceiver to send the second transmission is also in response to detecting the conflict.

11. The method of claim 9, wherein the medium reservation mitigation signal comprises instructions which, when executed, cause the first wireless device to communicate with the AP wireless device via a first wireless communication channel.

12. The method of claim 9, wherein the medium reservation mitigation signal comprises instructions which, when executed, cause the processor to clear a network allocation vector value associated with the pattern of medium reservations.

13. The method of claim 9, wherein the medium reservation mitigation signal comprises an interference signal transmitted using a communication frequency associated with the first transmission.

14. The method of claim 9, wherein the medium reservation mitigation signal facilitates preventing the first wireless device from yielding a medium of communication, including at least the first wireless communication channel, to the second wireless device.

15. The method of claim 9, wherein the indication of the pattern of medium reservations comprises information located within a vendor-specific field of an action frame of the second transmission.

16. The method of claim 9, wherein the second transmission comprises a probe request to facilitate initiation of a communication connection between the AP wireless device and the first wireless device, and wherein the indication of the medium reservation comprises vendor-specific information within a probe request frame body of the probe request.

17. A wireless network comprising:
    an access point (AP) wireless device; and
    a first wireless device communicatively coupled with the AP wireless device, the first wireless device comprising:
        a transceiver; and
        a processor coupled to the transceiver, wherein the processor is to:
            detect, within a first transmission received by the transceiver from a second wireless device, a pattern of medium reservations comprising a first reservation duration that satisfies a threshold duration value;
            cause, in response to detecting the pattern of medium reservations, the transceiver to send a second transmission to the AP wireless device, wherein the second transmission comprises an indication of the pattern of medium reservations; and
            detect a medium reservation mitigation signal within a third transmission received by the transceiver from the AP wireless device.

18. The wireless network of claim 17, wherein the processor is further to detect that a first prior transmission received from the second wireless device conflicts in time with a second prior transmission received from the AP wireless device, wherein causing the transceiver to send the second transmission is also in response to detecting the conflict.

19. The wireless network of claim 17, wherein the indication of the pattern of medium reservations comprises information located within a vendor-specific field of an action frame of the second transmission.

20. The wireless network of claim 17, wherein the second transmission comprises a probe request to initiate communication between the first wireless device and the AP wireless device, and wherein the indication of the medium reservation comprises vendor-specific information within a probe request frame body of the probe request.

* * * * *